US006853336B2

(12) United States Patent
Asano et al.

(10) Patent No.: US 6,853,336 B2
(45) Date of Patent: Feb. 8, 2005

(54) DISPLAY DEVICE, COMPUTER TERMINAL, AND ANTENNA

(75) Inventors: Takeshi Asano, Atsugi (JP); Ephraim B. Flint, Lincoln, MA (US); Kazuo Fujii, Kanagawa (JP); Brian P. Gaucher, New Milford, CT (US); Duixian Liu, Yorktown Heights, NY (US); Masaki Oie, Machida (JP); Thomas W. Studwell, Chapel Hill, NC (US); Hideyuki Usui, Chigasaki (JP)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 09/876,557

(22) Filed: Jun. 7, 2001

(65) Prior Publication Data

US 2002/0021250 A1 Feb. 21, 2002

Related U.S. Application Data

(63) Continuation-in-part of application No. 09/598,719, filed on Jun. 21, 2000, now Pat. No. 6,339,400.

(51) Int. Cl.[7] .............................. H01Q 1/24; G06F 1/16
(52) U.S. Cl. .................... 343/702; 343/720; 343/767; 343/872; 361/681; 361/683
(58) Field of Search ................... 343/702, 720, 343/767, 872, 873; 455/347; 361/681, 683

(56) References Cited

U.S. PATENT DOCUMENTS

| 5,138,328 A | * | 8/1992 | Zibrik et al. ................. 343/702 |
| 5,365,246 A | * | 11/1994 | Rasinger et al. ............. 343/702 |
| 5,677,698 A | * | 10/1997 | Snowdon ..................... 343/702 |
| 5,684,672 A | * | 11/1997 | Karidis et al. .............. 343/702 |

FOREIGN PATENT DOCUMENTS

WO          WO 9506338          3/1995

OTHER PUBLICATIONS

John D. Kraus. "Antennas", 2d Edition, McGraw–Hill, 1988, pp. 624–645.

\* cited by examiner

*Primary Examiner*—Michael C. Wimer
(74) *Attorney, Agent, or Firm*—F. Chau & Associates, LLC

(57) ABSTRACT

In a notebook type computer terminal, a plate type slot antenna is provided between a display panel and a surrounding wall of a display panel housing so that a radiator portion thereof is projecting from a frame of the display panel and a stay, which are made of conductive material by a length more than a predetermined dimension S. A ground portion of the antenna is connected not only to a ground of a radio transceiver unit but also to the display panel housing made of conductive material through the stay.

13 Claims, 22 Drawing Sheets

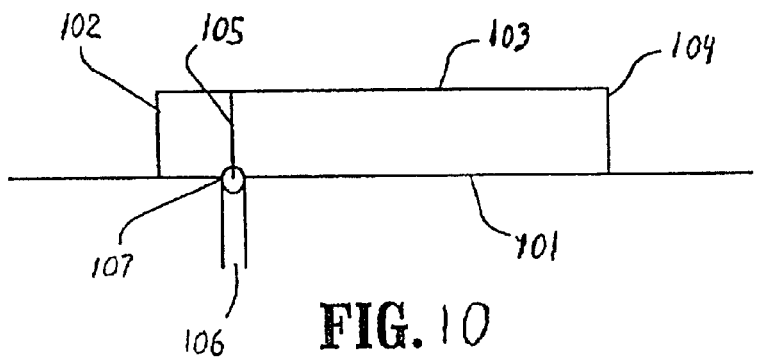
FIG. 10
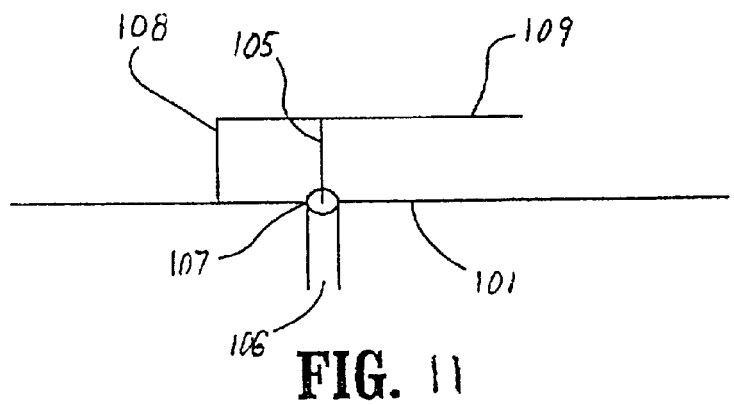
FIG. 11
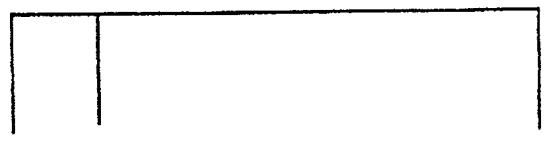
FIG. 12
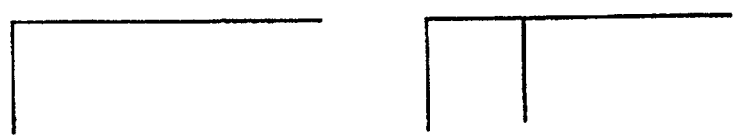
FIG. 13

| | |
|---|---|
| H (dBi) | −1.65 |
| V (dBi) | −17.00 |
| H+V (dBi) | −1.41 |
| Peak (dBi) | 4.37 |

| | |
|---|---|
| H (dBi) | −6.91 |
| V (dBi) | −7.88 |
| H+V (dBi) | −4.12 |
| Peak (dBi) | −1.61 |

HE: 4.3 dBi
VE: -8.9 dBi
TE: 4.3 dBi

———— HE: 0.6 dBi
– – – – VE: -0.5 dBi
–·–·–·· TE: 2.1 dBi

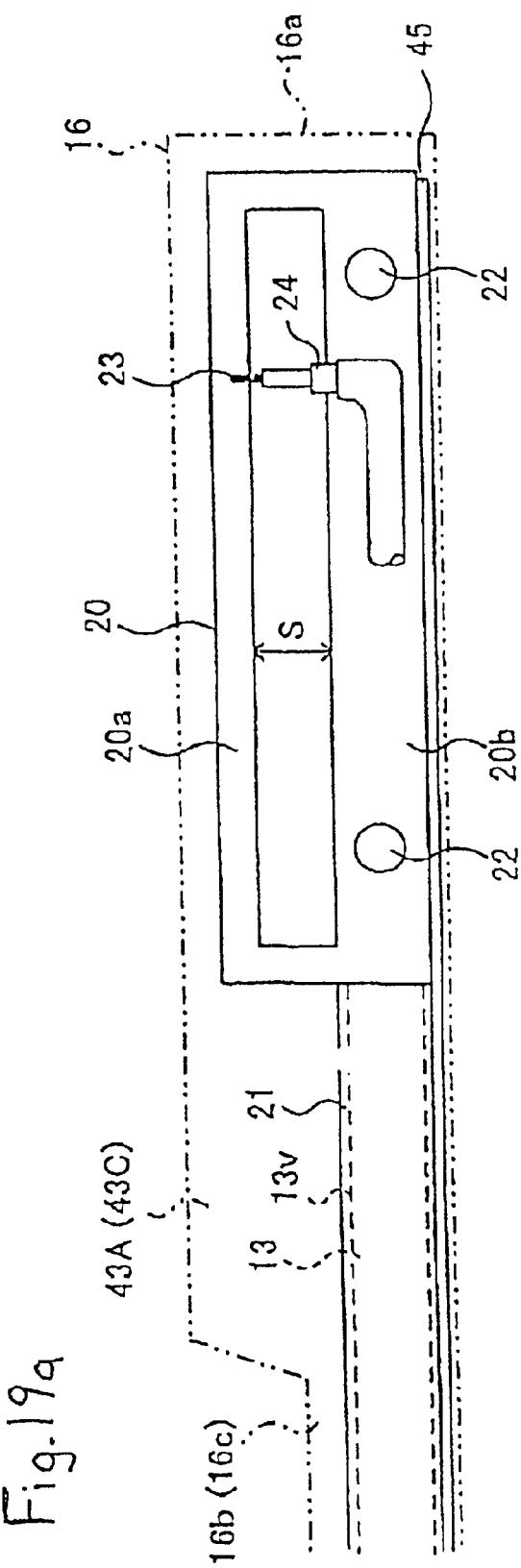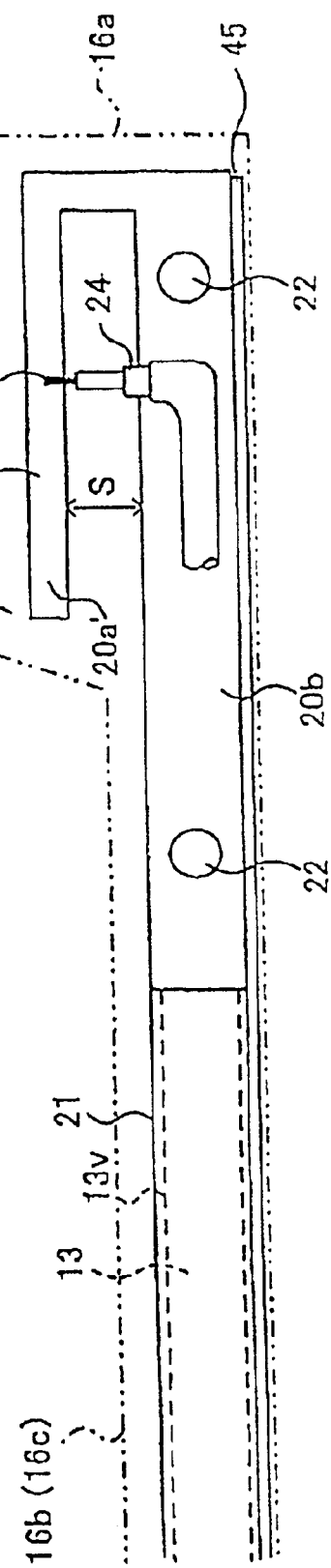

DISPLAY DEVICE, COMPUTER TERMINAL, AND ANTENNA

This is a continuation-in-part of Application Ser. No. 09/598,719, entitled "An Integrated Antenna for Laptop Applications," filed Jun. 21, 2000, now U.S. Pat. No. 6,339,400 B1, the disclosure of which in its entirety is incorporated by reference herein.

BACKGROUND OF THE INVENTION

1. Field of the Invention

The present invention relates to a display device, a computer terminal, and an antenna which are capable of wireless data communication.

2. Discussion of the Prior Art

Typically, a wired cable is used by a laptop to communicate with another processing device such as another laptop, desktop, server, or printer. To communicate without a wired connection, an antenna is needed. FIG. 1 shows two possibilities of outside antennas.

Antennas can be located at the top of a laptop display 1 for better RF clearance, or just outside (dash line for antenna) of a PCMCIA card 2. Usually, the laptop will have an optimum wireless performance if the antenna is mounted on the top of the display 1. However, an external antenna will generally be more expensive and susceptible to damage than an internal antenna. Alternatively, an internal or embedded antenna generally will not perform as well as an external antenna.

The commonly used method to improve the performance of an embedded antenna is to keep the antenna away from any metal component of the laptop. Depending on the design of the laptop and the type of antenna, the distance between the antenna and metal components could be at least 10 mm.

FIG. 2 shows some possible embedded antenna implementations. Two antennas are typically used, though applications implementing one antenna are possible. In one case, the two antennas are placed on the left 3 and right 4 edge of the display. Using two antennas instead of one antenna will reduce the blockage caused by the display in some directions and provide space diversity to the communication system. As a result, the size of the laptop becomes larger to accommodate antenna placement. In another configuration, one antenna can be placed on one side (3 or 4) of the display and a second antenna on the top 5 of the display. This latter antenna configuration may also provide antenna polarization diversity depending on the antenna design used.

For a computer terminal shown in FIG. 2B, since the antenna 1 is of a folding type, some time and labor will be needed for making the antenna 1 upright or folded and in addition, some moving parts may be damaged or the antenna may interfere with using the keyboard 6. Moreover, since the antenna 1 is attached to the base unit 7, the antenna location may be too low to achieve good receiving conditions.

For the computer terminal shown in FIG. 15, there may be another problem, since the antenna 157 is built in the housing 6 and it is located in its highest position when it is used. However, when the sleeve dipole antenna 157 is built in the housing 156, the housing 156 may become larger and display panel 155 smaller. This may be because the frame forming the outer portion of the display panel 155 is made of conductive metal and radio signals may be absorbed by the frame, thus the receiving capability of the antenna 157 may be degraded if the antenna 157 is not sufficiently distant from the frame. For example, when radio signals within a 2.5 GHz band are received, the antenna 157 of sleeve dipole type must be at a distance of approximately 30 mm from the outer portion of the display panel 155. In this way, when the antenna 157 is located at a distance from the outer portion of the display panel 155, the housing 156 will bulge in the lateral direction or the display panel 155 must be smaller if such bulging of the housing 156 is undesirable.

Particularly, a computer terminal may have a large display panel with an overall size unchanged or reduced and thus, as shown in FIG. 2C, spaces C1 and C2 between a display panel 8 and a housing 7 tend to be smaller and this tendency may go against the above-mentioned problems.

In addition, recently, the display housing 9 may be made of carbon fiberglass reinforced plastics (CFRP) or other suitable material for weight reduction. However, when the display housing 9 is made of CFRP, the antenna cannot receive radio signals through the display housing 9 on its backside but receive radio signals through the display panel 8 on its front side only, since CFRP is conductive material.

As wireless communications among processing devices become increasingly popular, a need exists for a compact integrated antenna having reduced costs and reliable performance.

SUMMARY OF THE INVENTION

To attain these and other objects, a display device according to the present invention is characterized in that the display device comprises an antenna located between the outer side face of a display panel and the inner surface of a housing and this antenna has a radiator portion provided at a predetermined distance from portions of the display panel and the housing that are made of conductive material and a ground portion connected to the portions made of conductive material. It should be appreciated that the portions of the display panel and the housing that are made of conductive material may include a metal frame provided on the outer portion of the display panel, stay for supporting the display panel, and the housing itself if it is made of CFRP or other suitable material.

It should be also appreciated that the display device may include a display panel of a notebook type personal computer (PC), a monitor with a liquid crystal display panel, and a single display device.

Thus, the gain in radio reception can be improved by providing the radiator portion of the antenna at a distance from the conductive material. For this purpose, the radiator portion may be provided at a distance from the portions made of conductive material in the direction orthogonal to the display surface of the display panel or in the direction parallel to the display surface of the display panel. It should be appreciated that the radiator portion is provided at a distance from the conductive material to prevent the radio from being absorbed by the conductive material and it is desirable that the distance is more than that determined according to the wavelength of radio to be transmitted and received.

The antenna is not limited to a sheet type one but the space between the outer side face of the display panel and the inner surface of the housing can be minimized by using a plate type slot antenna or an inverted-F type antenna.

A computer terminal according to the present invention is capable of opening and closing by rotatably connecting a first housing with a built-in display panel and a second housing with a keyboard like a so-called notebook type PC and the antenna is built in a rib formed on the outer portion of the first housing to transmit and receive radio signals for communicating data between the computer terminal and outside. This antenna may be sandwiched between the rib formed on the outer portion of the housing and a frame filling a space between the housing and the display panel.

In addition, the second housing may be configured to have a recess for receiving the rib when the first housing and the second housing are closed.

Furthermore, if the antenna is formed to be located on the top of the computer terminal when the first housing is opened to be in an upright position with respect to the second housing, that is, when the notebook type PC is used, the antenna's receiving conditions can be improved as compared when the antenna is located in lower positions.

The present invention can be also implemented as a computer terminal which comprises a display panel for displaying images, a housing made of conductive material for containing the display panel, a control unit controlling the display panel, and an antenna located between the outer side face of the display panel and the inner surface of the housing and electrically grounded to the housing.

When another housing is rotatably connected to the housing like a notebook type PC, the antenna may be grounded to the housing made of conductive material via a hinge unit rotatably connecting the housing and the other housing.

This antenna may be grounded through a ground line one end of which is connected to the antenna.

It is desirable that a radiator portion of the antenna is provided at a predetermined distance from the housing made of conductive material and the frame of the display panel and it is also desirable that the housing has a cut-out formed to be at a predetermined distance from the radiator portion. For this purpose, this cut-out may have a cover made of non-conductive material.

The above-mentioned configuration can be applicable to any computer terminal which has a display panel and a capability for wireless data transmission/reception such as a notebook type PC, a desktop PC, a personal data assistant, or a game terminal with a liquid crystal display panel.

The present invention can be implemented as an antenna, which is characterized in that a ground portion of the antenna is in electrically connected with a first ground via a ground line connected at a predetermined location and in electrically connected with a second ground via a support member supporting a display panel. For this purpose, it is preferable that the first ground is a ground provided in a circuit to process radio signals transmitted and received by the antenna and it is also preferable that the second ground is a ground other than the first ground, for example, a ground for the display panel. When the housing of a display device is formed of conductive material, the housing may serve as the second ground by connecting the support member to the housing. Thus, the ground capacity of the antenna can be increased by providing the second ground in addition to the first ground.

It should be appreciated that the electrical connection to the second ground can be ensured by fastening the ground portion of the antenna to the support member with a fastening member such as screws or rivets, which is excellent in durability as compared with, for example, conductive tape because it may not be peeled off.

It should be further appreciated that a plurality of antennas of this type may be provided for a display device or a computer terminal and in addition, diversity may be used to select an antenna with good receiving conditions for receiving radio signals.

According to an embodiment of the present invention, a display device is provided. The display device includes a display panel having a display surface for images and an outer side face adjacent to said display surface and a housing containing said display panel and having an inner surface opposed to said outer side face of said display panel. The display device further includes an antenna located between said outer side face of said display panel and said inner surface of said housing wherein said antenna includes a radiator portion provided at a predetermined distance from a conductive material portion of said display panel and/or said housing and a ground portion connected to said portions made of conductive material.

The display device includes a rib formed on the outer portion of said housing so that it projects approximate vertically to said display surface of said display panel, and a frame filling a space between said housing and said display panel wherein said antenna is sandwiched between said rib and said frame.

The antenna is a plate type slot antenna or an inverted-F type antenna. The radiator portion of said antenna is located at a predetermined distance from said portions made of conductive material in a direction orthogonal to said display surface of said display panel. The radiator portion of said antenna is located at a predetermined distance from said portions made of conductive material in a direction parallel to said display surface of said display panel.

According to an embodiment of the present invention, a computer terminal is provided which is capable of opening and closing. The computer terminal includes a first housing with a built-in display panel, and a second housing rotatably connected to one end of said first housing wherein said first housing has a rib on its outer portion which projects from the side opposed to said second housing wherein said rib contains an antenna which transmits and receives radio signals for communicating data between said computer terminal and outside. The second housing includes, at a location corresponding to said rib of said first housing, a recess for receiving said rib when said first housing and said second housing are closed.

The antenna is formed to be located on almost the top of said computer terminal when said first housing is opened to be in an upright position with respect to said second housing. The antenna has a radiator portion which transmits and receives radio signals, provided at a distance larger than a dimension determined from the wavelength of radio signals to be transmitted and received by said antenna, from portions of said display panel and said first housing that are made of conductive material.

A computer terminal is provided according to an embodiment of the present invention, including a display panel having a display surface for images and an outer side face adjacent to said display surface, and a housing made of conductive material and having an inner surface opposed to said outer side face of said display panel for containing said display panel. The computer terminal includes a control unit controlling said display panel, and an antenna transmitting radio signals to/receiving radio signals from outside and transferring signals based on said radio signals between said control unit wherein said antenna is located between said outer side face of said display panel and said inner surface of said housing and is electrically grounded to said housing.

The computer terminal further includes another housing rotatably connected to said housing, and a hinge unit made of conductive material and rotatably connecting said housing and said another housing wherein said antenna is grounded to said housing via said hinge unit.

One end of a ground line is connected to said antenna and the other end of said ground line is connected to a ground made of conductive material.

The antenna has a radiator portion provided at a predetermined distance from said housing and the frame of said display panel wherein said housing has a cut-out formed to be at a predetermined distance from said radiator portion and said cut-out has a cover made of non-conductive material to fill said cut-out.

A rib is formed on the outer portion to project toward said display surface of said display panel and said rib is provided with said cut-out and said cover.

An antenna mounted on a display device comprising a display panel, a first ground, and a second ground wherein said antenna includes a radiator portion transmitting/receiving radio signals and having a feeder connected thereto at a predetermined location in its longitudinal direction, and a ground portion connected to said first ground and said second ground wherein said ground portion is in electrically connected with said first ground via a ground line connected at a location corresponding to said predetermined location of said radiator portion and in electrically connected with said second ground via a support member supporting said display panel.

The housing of said display device is formed of conductive material, wherein said support member is connected to the housing of said display device.

The ground portion is fastened to said support member with a fastening member.

The radiator portion is provided at a predetermined distance from portions of said display device that are made of conductive material.

According to an embodiment of the present invention, an integrated antenna arrangement is provided. The integrated antenna arrangement includes a conductive RF shielding foil disposed on the back of an electronic display having a hole, and a feed portion extending partially across the hole forming a slot antenna.

The antenna arrangement further comprises a means for conducting a signal comprising a first component for conducting the signal connected to the feed portion and a second component for grounding the conducting means connected to the RF foil opposite the feed portion. The means for conducting the signal is a coaxial cable having an inner conductor connected to the feed portion and an outer conductor connected to the RF foil opposite the feed portion.

An impedance match is achieved by positioning a feed conductor at a midpoint of the length of the antenna arrangement for increasing impedance and towards an end of the length for decreasing the impedance.

An integrated antenna arrangement is provided according to an embodiment of the present invention including a conductive RF shielding foil disposed on the back of an electronic display having a notch, and a feed portion extending partially across the notch forming an inverted-F antenna.

The antenna arrangement further comprises a means for conducting a signal comprising a first component for conducting the signal connected to the feed portion and a second component for grounding the conducting means connected to the RF foil opposite the feed portion. The means for conducting the signal is a coaxial cable having an inner conductor connected to the feed portion and an outer conductor connected to the RF foil opposite the feed portion.

An impedance match is achieved by positioning a feed conductor at an open end of the length of the antenna arrangement for increasing impedance and towards a closed end of the length for decreasing the impedance.

BRIEF DESCRIPTION OF THE DRAWINGS

Preferred embodiments of the present invention will be described below in more detail with reference to the accompanying drawings:

FIG. 10 illustrates a slot antenna according to an embodiment of the present invention;

FIG. 11 illustrates a inverted-F antenna according to an embodiment of the present invention;

FIG. 12 illustrates various configurations for stamped and wire slot antennas according to an embodiment of the present invention;

FIG. 13 illustrates various configurations for stamped and wire inverted-F antennas according to another embodiment of the present invention;

FIG. 19($a$) shows a slot antenna in a side view according to an embodiment of the present invention;

FIG. 19($b$) shows an inverted-F type antenna in a side view according to an embodiment of the present invention.

DETAILED DESCRIPTION OF PREFERRED EMBODIMENTS

According to an embodiment of the present invention, embedded antennas are disposed on an edge of a laptop display, the metal rims that supports the display, and/or in an RF shielding foil backing the display. Many antenna types, such as chip antennas, slot antennas, inverted-F antennas and notch antennas, are applicable in this design. The advantages of this design include: smaller antenna size, inexpensive to manufacture, minimum effects on industrial design, and reliable performance.

Figure 1:
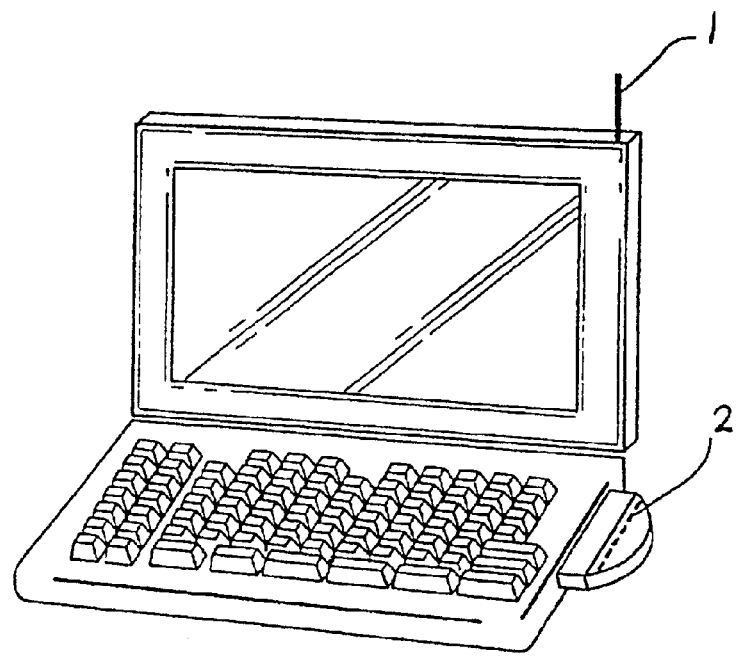
FIG. 1 (prior art) illustrates two outside antennas.
Figure 2:
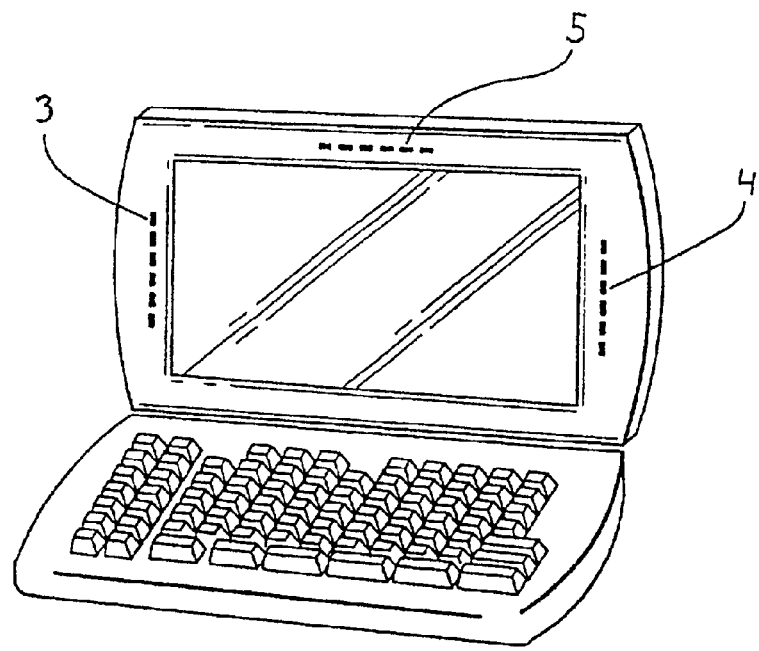
FIG. 2A (prior art) illustrates whip-like/slot embedded antennas.
FIG. 2B (prior art) illustrates an external whip-like antenna.
FIG. 2C (prior art) illustrates a computer terminal.
Figure 2B:
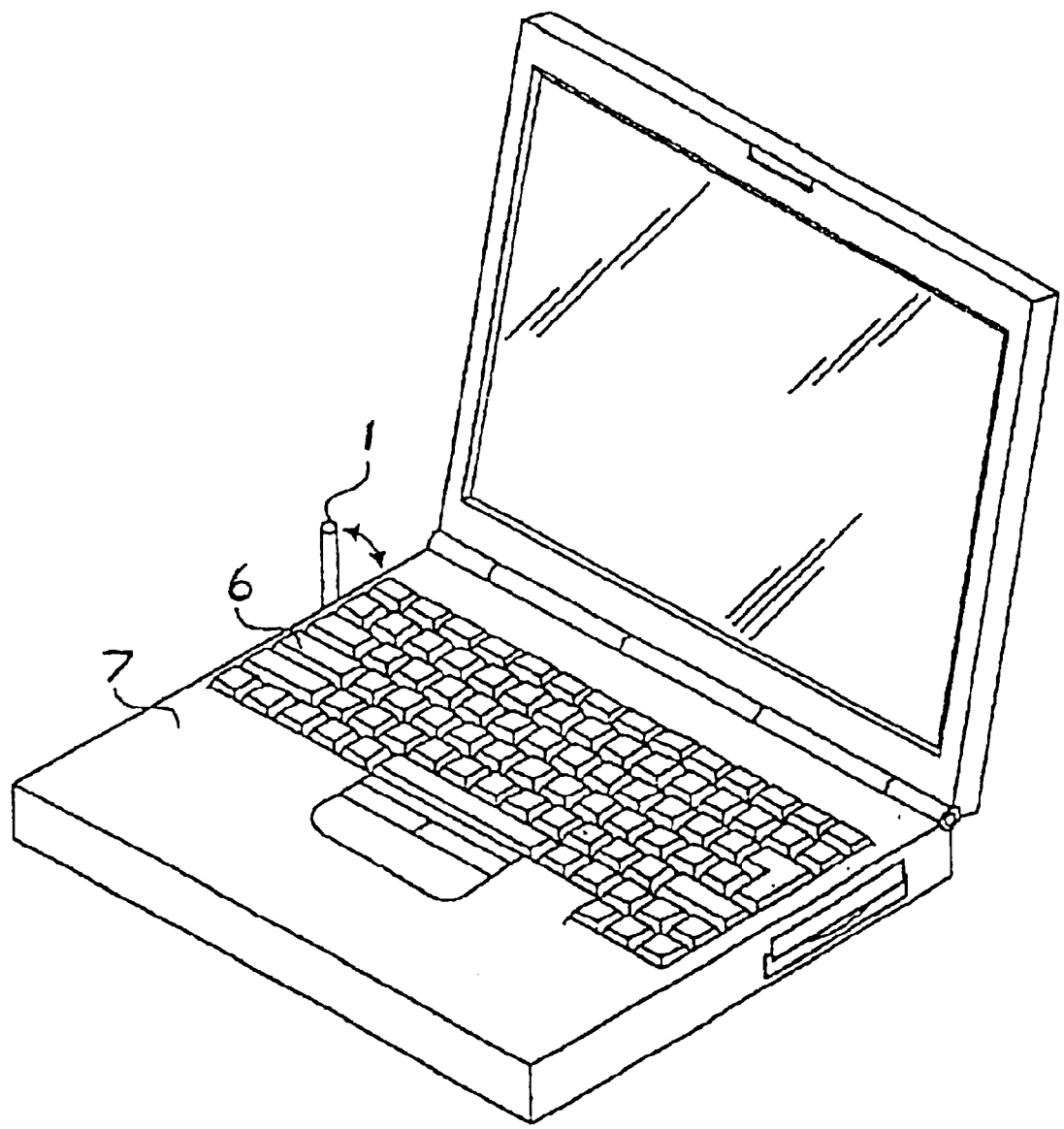
Figure 2C:
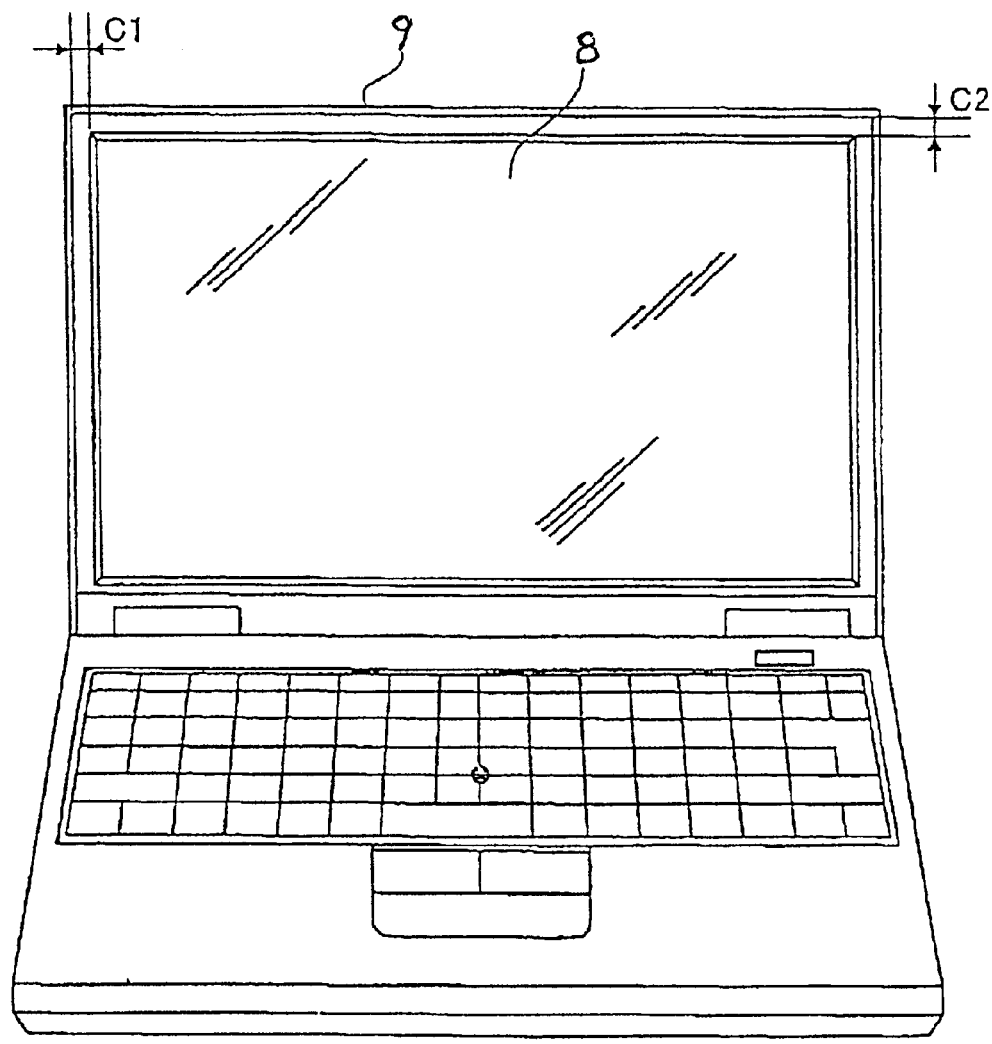
Figure 3A:
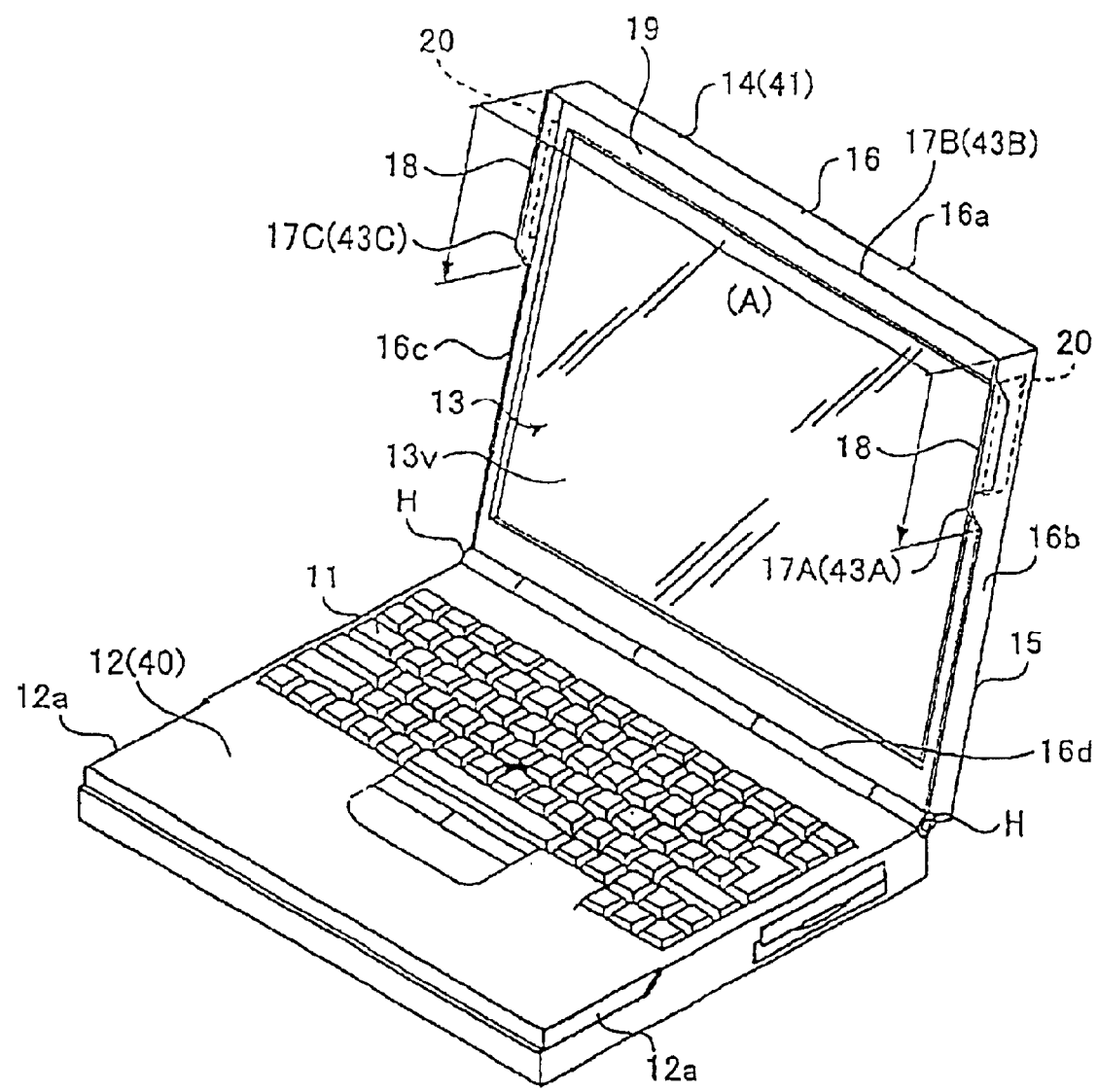
FIG. 3A shows a configuration of a computer terminal according to an embodiment of the present invention.

FIGS. 3A–3F show illustrative configurations of a computer terminal according to an embodiment of the present invention. As shown in FIG. 3A, the notebook computer terminal includes a base housing (second housing) 12 with a keyboard 11 and a display panel housing (housing, first housing, second ground) 14 with a display panel 13. The base housing 12 and the display panel housing 14 are rotatably connected to each other through a hinge unit H. It should be appreciated that the base housing 12 and the display panel housing 14 are made of conductive materials, for example, CFRP.

The base housing 12 includes a mother board with a control circuit (control unit) mounted thereon to execute a predetermined process on inputs from the keyboard 11 and to display the process results on the display panel 13, a hard disk drive (HDD) to store data, and the like are provided.

The display panel housing 14 includes the display panel 13 and an antenna 20 for wireless data transmission/reception between the control circuit and outside.

Figure 4:
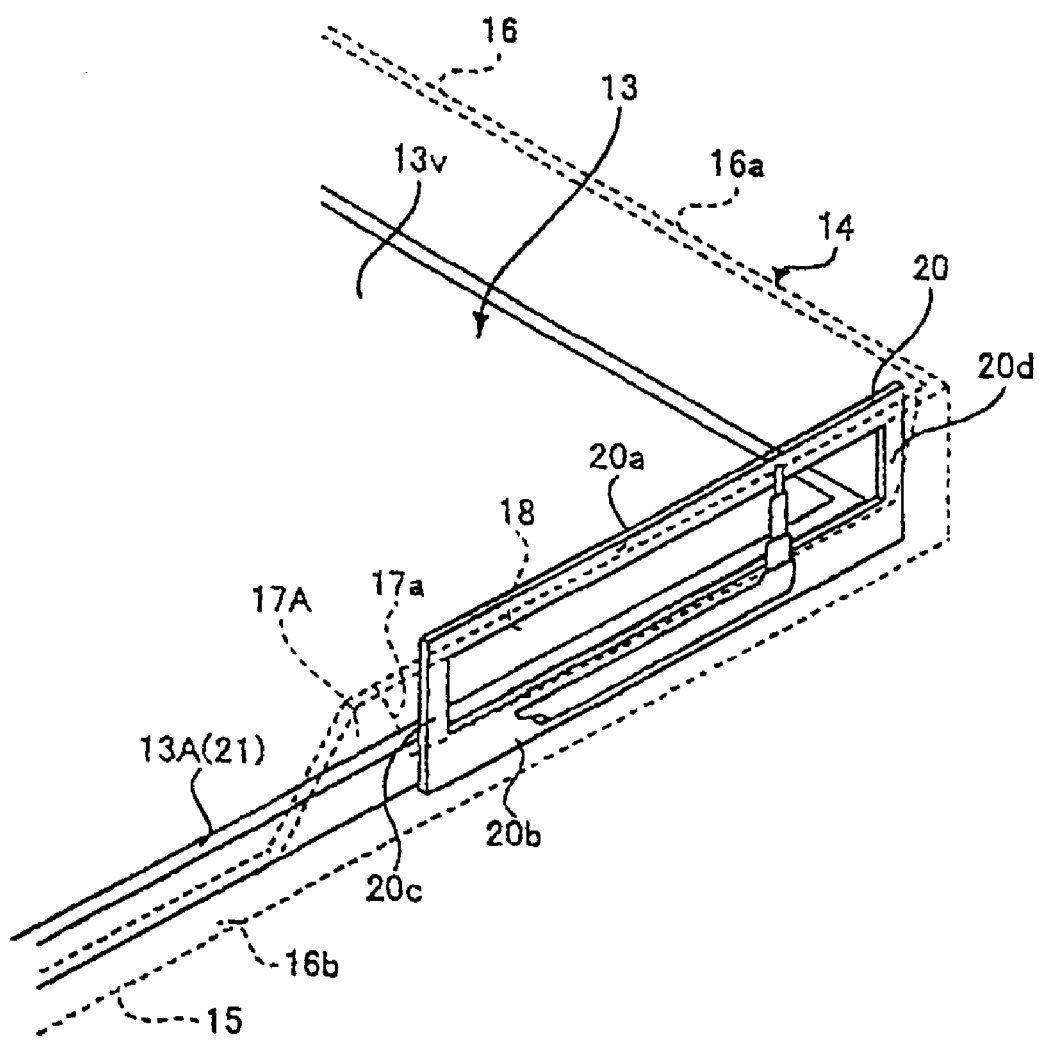
FIG. 4 is a perspective view for showing a portion of stiffening ribs provided with an antenna according to an embodiment of the present invention.

As shown in FIG. 4, the display panel 13 is a plate approximately rectangular on a plan-view basis having a predetermined thickness. A metal frame 13A is provided continuously throughout the outer portion of its display surface 13$v$ and the outer side face 13$s$ adjacent to the display surface 13$v$.

Figure 5:
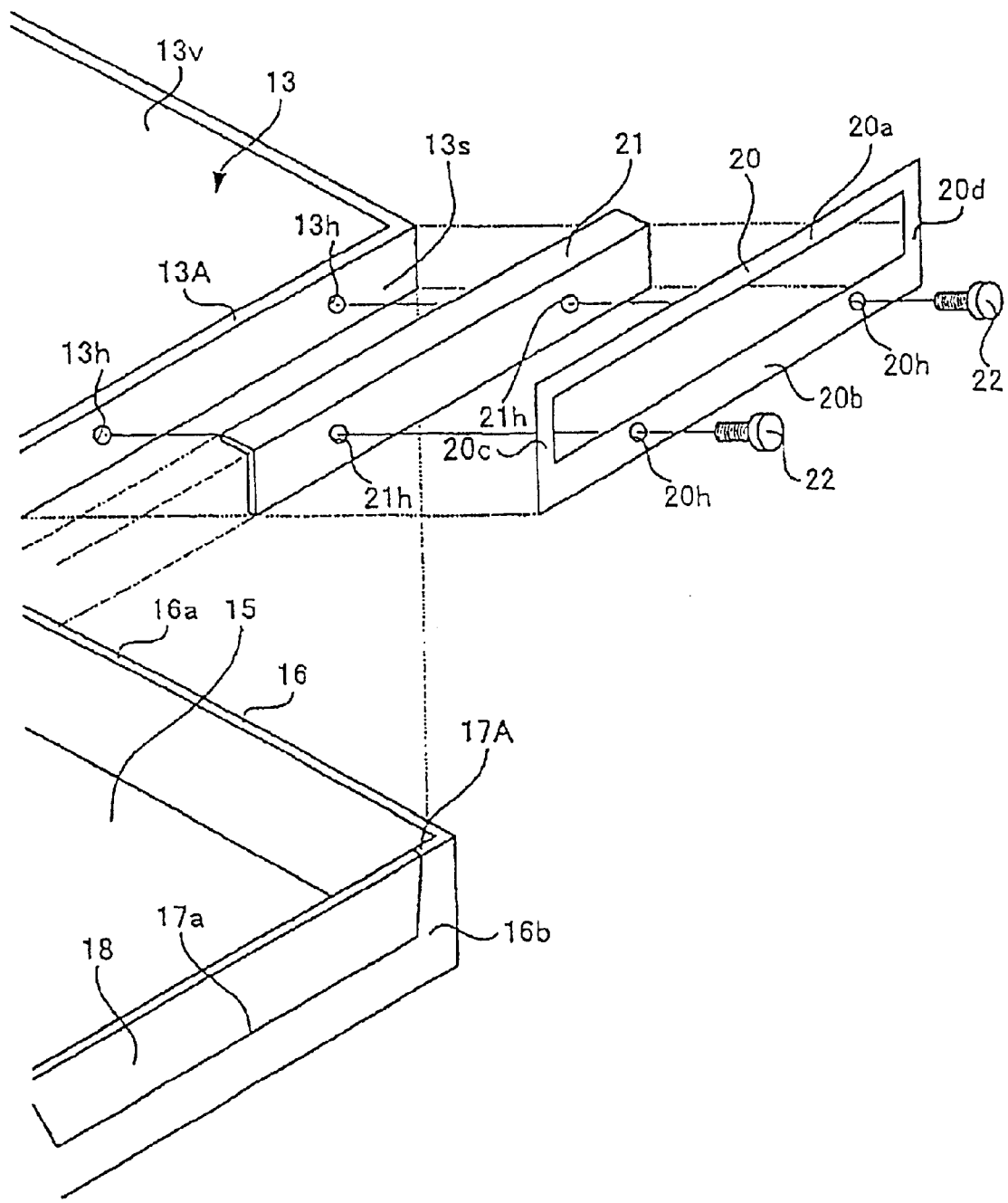
FIG. 5 is an exploded view of FIG. 4 according to an embodiment of the present invention.

As shown in FIGS. 4 and 5, the display panel housing 14 is a box which is open to receive the display panel 13 and has a bottom surface 15 opposed to the back surface of the display panel 13 (the surface on the opposite side of the display surface 13$v$) and a surrounding wall 16 which rises up from the outer portion to receive the display panel 13 and forms an inner surface opposed to the outer side face 13$s$ of the display panel 13.

It should be appreciated that as shown in FIG. 3A, the surrounding wall 16 is formed having a larger height from the bottom surface 15 in the area A including edge 16$a$ on the opposite side of the base housing 12 and part of edges 16$b$ and 16$c$ adjacent to the edge 16$a$ as compared with in the area including edge 16$d$ on the side of the base housing 12 and the remaining part of the edges 16$b$ and 16$c$. Stiffening ribs 17A, 17B, and 17C are continuously formed on the edges 16$a$, 16$b$, and 16$c$ of the surrounding wall to avoid deformation in the display housing 14.

The base housing 12 includes a recess 12$a$ for receiving the stiffening ribs 17A, 17B, and 17C when the computer terminal is folded away so that the keyboard 11 faces the display panel 13.

As shown in FIGS. 4 and 5, each of the stiffening ribs 17A and 17C has a cut-out 17$a$ formed at a predetermined location so that the height is smaller than the other area of the edges. In addition, the cut-out 17$a$ has a cover 18 made of non-conductive resin material. This cover 18 is formed to have the about same height as the other area of the stiffening ribs 17A and 17C (except in the area of the cut-out 17$a$) when it is installed on the cut-out 17$a$.

As shown in FIG. 3A, the display panel 13 is contained in the internal space of the display panel housing 14 and some space between the outer portion of the display panel 13 and the display panel housing 14 is filled with a bezel 19.

Figure 3B:
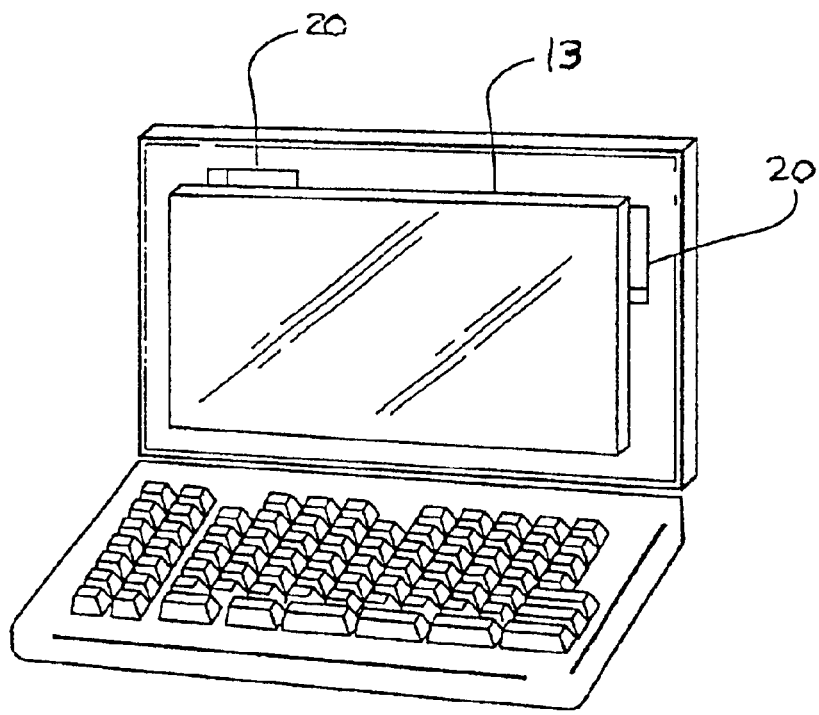
FIG. 3B shows a configuration of a computer terminal having two slot antennas disposed in the plane of the display according to an embodiment of the present invention.
Figure 3C:
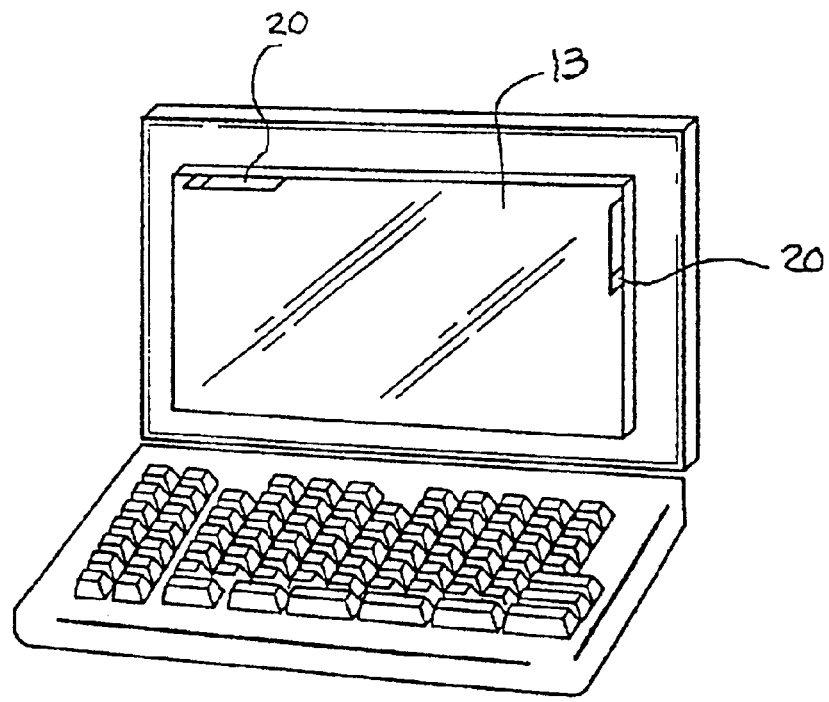
FIG. 3C shows a configuration of a computer terminal having two slot antennas transversely disposed (in a z axis relative to the display substantially in the x and y axes) according to an embodiment of the present invention.
Figure 6:
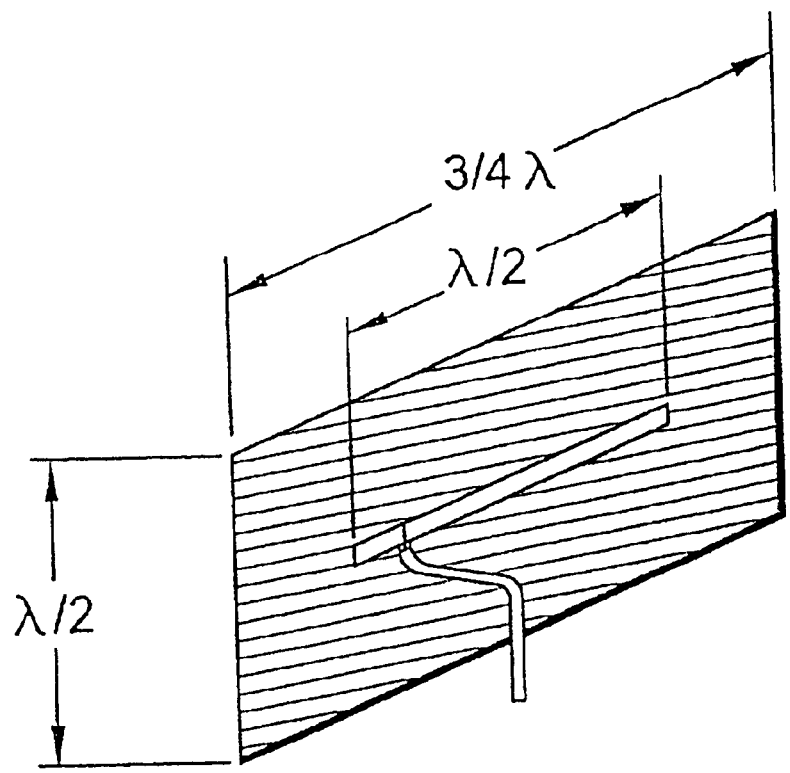
FIG. 6 (prior art) is a view of a slot antenna.

Referring to FIGS. 3B and 3C, the display panel 13 supports an antenna 20, or the RF shielding foil forming an antenna on the back of the display 13. The slot antenna of the present invention is a different from a traditional slot that needs a large ground plane as shown in FIG. 6 where the slot is at the center of the metal ground plate. The slot antenna can be parallel (in the plane of the display) or perpendicular (in a z axis relative to the display panel substantially in the x and y axes) to the display as shown in FIGS. 3B and 3C respectively, depending on the industrial design requirements. The two antenna orientations described have similar performances. One skilled in the art will recognize that other orientations, configurations and combinations thereof are possible, for example, an antenna oriented at an angle to the display, a system having a pair of antennas including one inverted-F antenna and one slot antenna, or a single antenna.

Figure 3D:
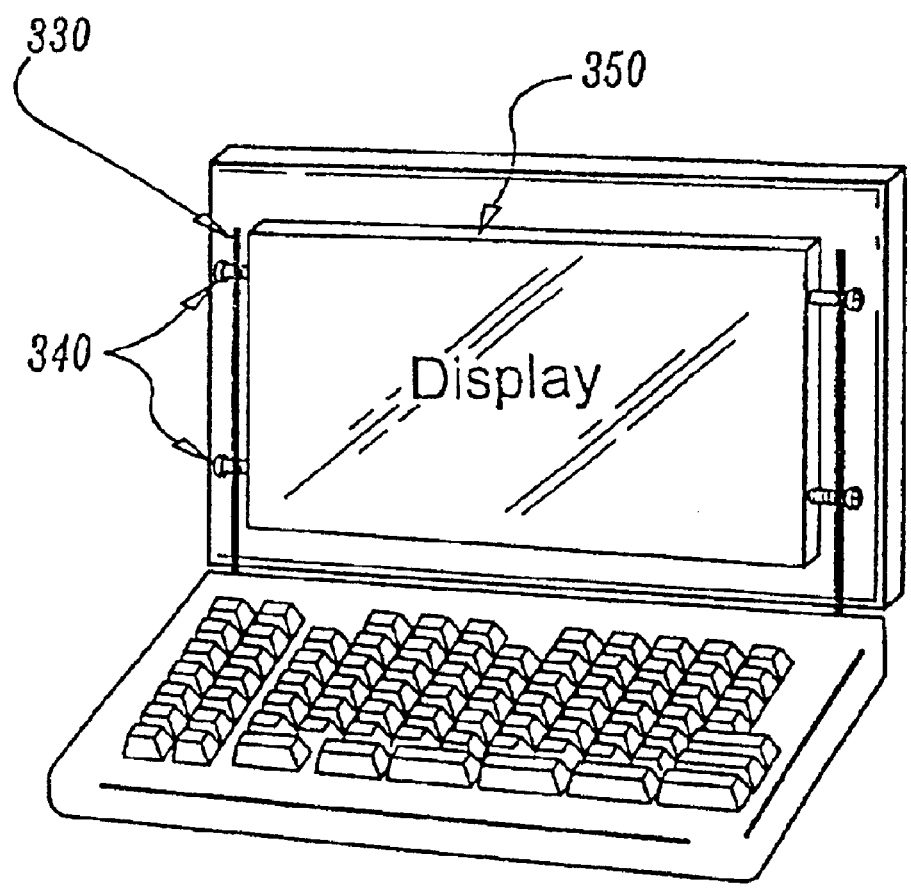
FIG. 3D shows a configuration of a computer terminal according to an embodiment of the present invention.

FIG. 3D shows the interior of a laptop display which is mounted on metal supports 330 via screws 340. The metal support includes embedded antenna, which electrically connects to the metal frame 350 of the display.

Figure 3E:
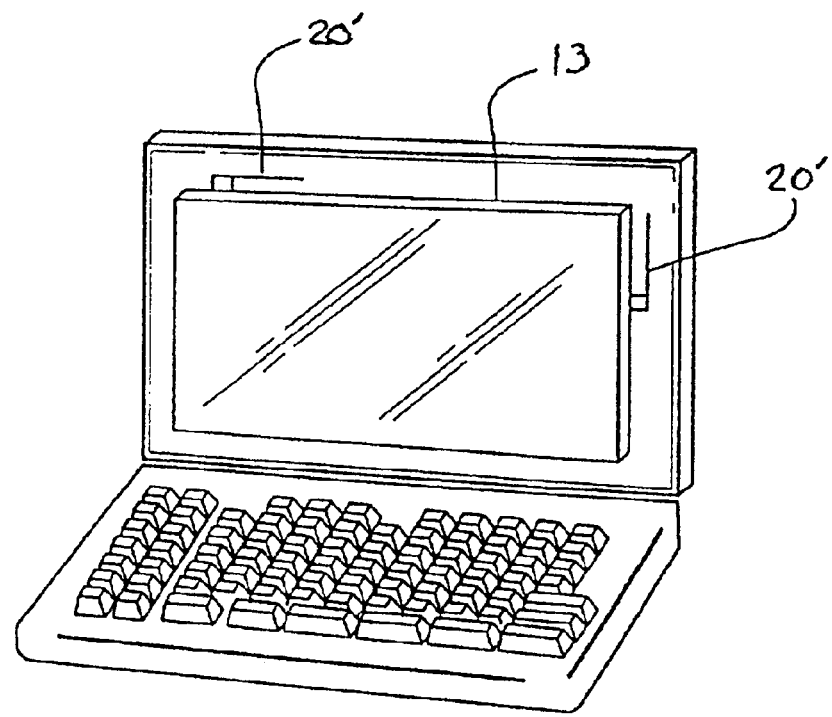
FIG. 3E shows a configuration of a computer terminal having two inverted-F antennas disposed in the plane of the display according to an embodiment of the present invention.
Figure 3F:
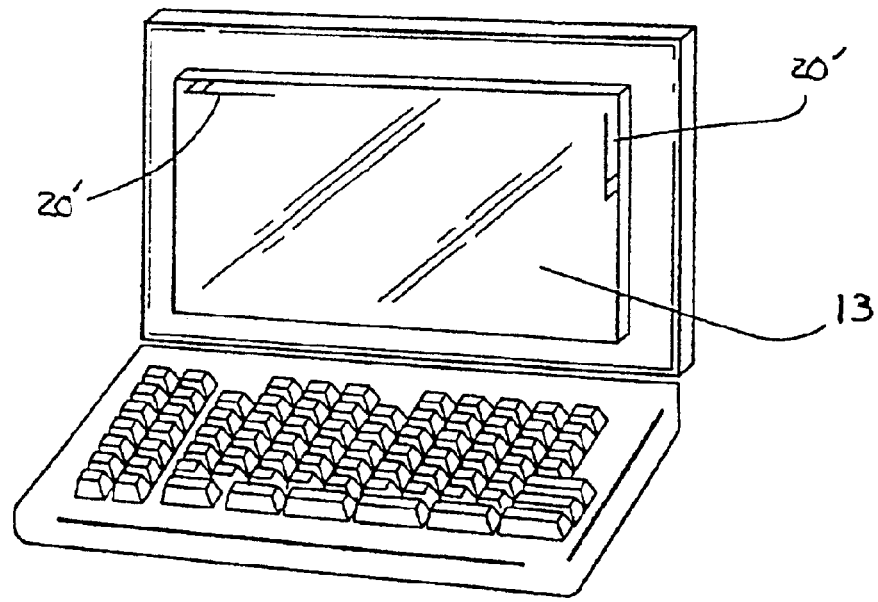
FIG. 3F shows a configuration of a computer terminal having two inverted-F antennas transversely disposed (in a z axis relative to the display substantially in the x and y axes) according to an embodiment of the present invention.
Figure 14:
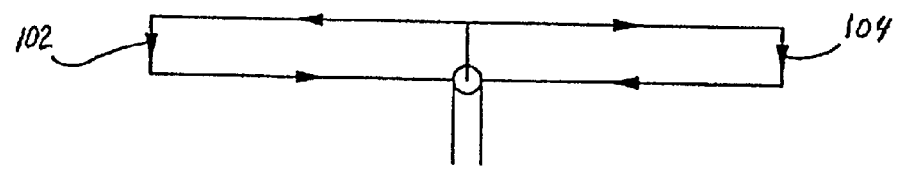
FIG. 14 (prior art) illustrates a known slot antenna without a ground plate.

Referring to FIGS. 3E and 3F, where space is limited, an inverted-F antenna 20' may be used, the inverted-F antenna 20' has about half length of the slot antenna. The inverted-F antenna 20' has wide standing wave ratio (SWR) bandwidth, but the gain value is usually lower than that of the slot antenna. The wide SWR bandwidth of the inverted-F antenna 20' is due to its lower efficiency. For a simple slot antenna as shown in FIG. 14, the radiation primarily comes from the two short sides 102, 104 of the slot if the slot is very narrow. The two radiating sides form a two short sides of the slot if the slot is very narrow. The two radiating sides 102, 104 form a two element array with half wavelength separation. The high gain (or efficiency) is due to the array factor. Referring to FIG. 11, the inverted-F antenna has only one radiating element 108. For a slot antenna, impedance match is achieved by moving the feed line toward the center to increase impedance or toward the end to decrease impedance. Alternatively, for an inverted-F antenna, impedance match is achieved by moving the feed line toward the open end of the antenna to increase impedance or toward the closed end to decrease impedance.

Referring to FIG. 3A, the antenna 20 is built in the stiffening ribs 17A and 17C on both sides of the display panel 13. As shown in FIGS. 4 and 5, a plate type slot antenna is used as the antenna 20. This antenna 20 has, for example, a rectangular contour with a slot at the center thereof to be shaped like a window frame and comprises a radiator portion 20a and a ground portion 20b provided at a predetermined distance therefrom as well as connections 20c and 20d for connecting the radiator portion 20a and the ground portion 20b on both ends thereof. In addition, the antenna 20 has a half-wave length which is half the wavelength of radio signals to be transmitted and received.

As shown in FIG. 5, the antenna 20 is inserted between the display panel 13 and the edge 16b (and the edge 16c) of the surrounding wall 16 of the display panel housing 14 within the stiffening ribs 17A and 17C. More specifically, a stay (hinge unit, support member) 21 is provided on the outer side face 13s of the display panel 13 to hold the display panel 13 and thus, the antenna 20 intervenes between the stay 21 and the inner surface of the edge 16b of the surrounding wall 16.

The stay 21 is made of conductive metal material to be approximately L-shaped on a cross-section basis and the stay 21 is provided along the outer side face 13s of the frame 13A of the display panel 13 and the display surface 13v (or the opposite surface).

The antenna 20, the stay 21, and the frame 13A of the display panel 13 have holes 20h, holes 21h, and threaded holes 13h formed at predetermined locations, respectively. The antenna 20 is fastened to the stay 21 and the frame 13A of the display panel 13 by passing mounting screws (fastening member) 22 made of conductive metal material through the holes 20h and 21h and squeezing them into the threaded holes 13h.

It should be appreciated that the ground portion 20b of the antenna 20 is brought in close contact with the stay 21 at the point of time. This can ensure that the ground portion 20b of the antenna 20 is electrically connected to the frame 13A of the display panel 13 through the stay 21.

Figure 7:
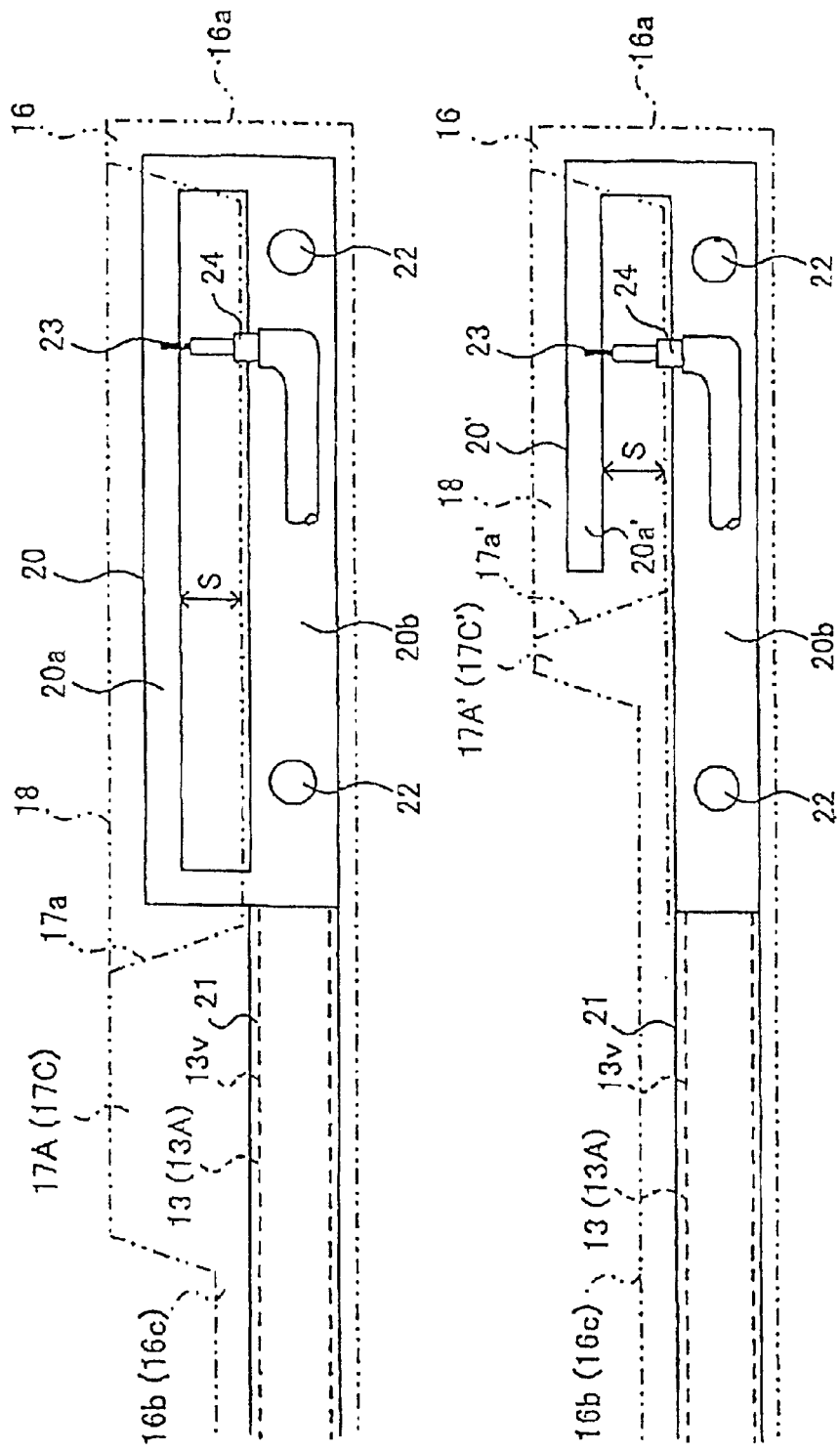
FIG. 7A shows a slot antenna is a side view for showing a portion provided with an antenna according to an embodiment of the present invention.
FIG. 7B shows an inverted-F type antenna is a side view for showing a portion provided with an antenna according to an embodiment of the present invention.

As shown in FIGS. 4 and 7A, the radiator portion 20a of the antenna 20 is projecting from the frame 13A of the display panel 13 and the stay 21, which are made of conductive material, by a length more than a predetermined dimension S in the direction orthogonal to the display surface 13v of the display panel 13 and is also projecting (exposed) from the cut-outs 17a formed in the stiffening ribs 17A and 17C of the display panel housing 14, which are also made of conductive material, by a length more than the predetermined dimension S. It should be appreciated that the predetermined dimension S is selected depending on the frequency of radio signals to be transmitted and received by the antenna 20.

It should be also appreciated that the radiator portion 20a is covered with the covers 18 installed on the cut-outs 17a.

As shown in FIG. 7A, one end of an feed line 23 is joined to the antenna 20 through a joint means such as soldering at a predetermined location which is to be a feeding point for the radiator portion 20a. A ground line 24 is joined to the ground portion 20b at a predetermined location (corresponding to the location where the feed line 23 is joined to the radiator portion 20a) through a joint means such as soldering. It should be appreciated that according to this embodiment, the feed line 23 and the ground line 24 are implemented with a coaxial cable and the feed line 23 forms an inner conductor at the center and the ground line 24 forms an outer conductor on the outer side.

Figure 8:
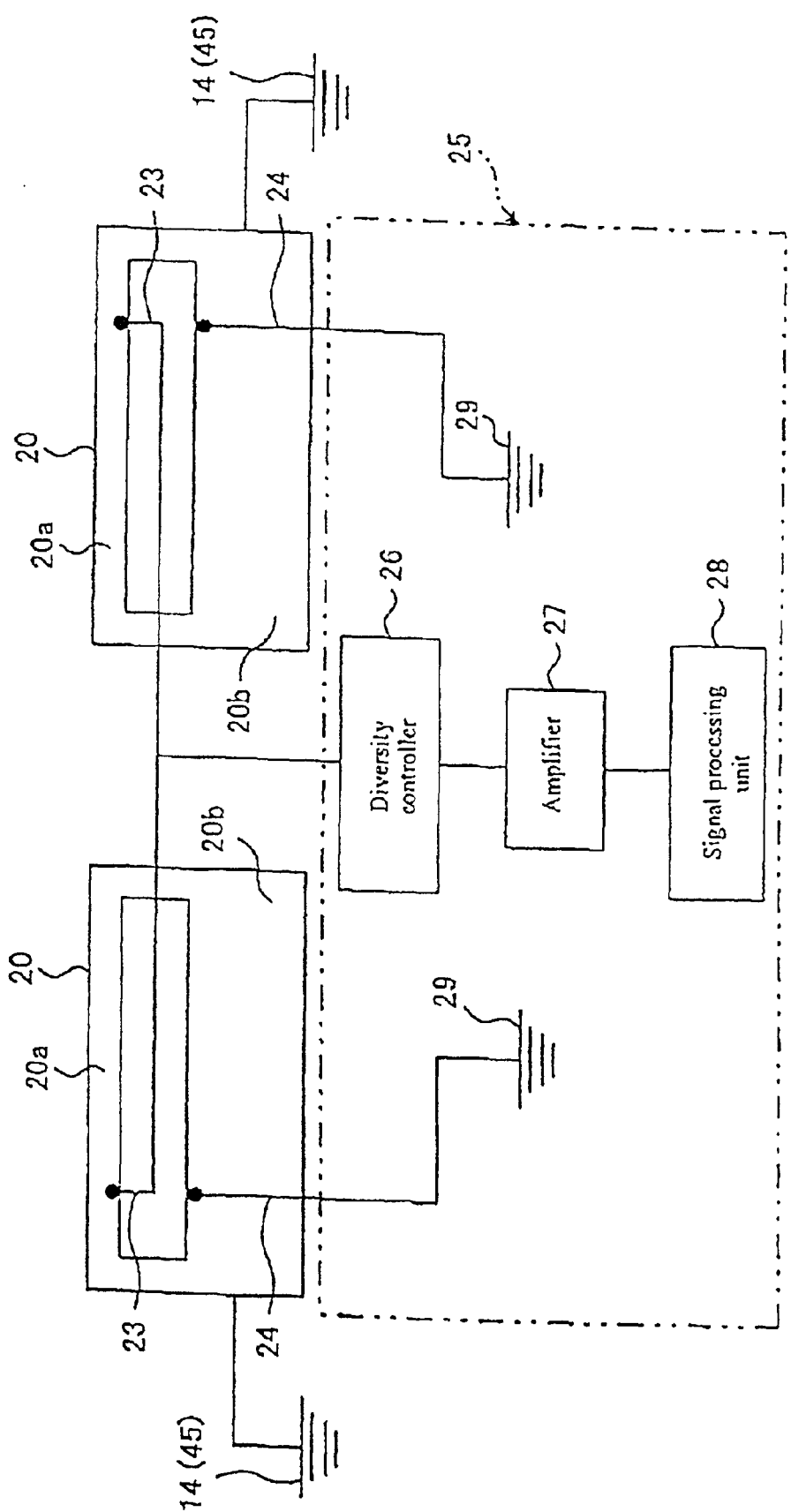
FIG. 8 shows a configuration of a radio transceiver unit connected to an antenna according to an embodiment of the present invention.

As shown in FIG. 8, feed line 23 is connected to a radio transceiver unit 25 for converting radio signals to signals. According to this embodiment, since antenna 20 is provided on either side of the display panel 13 as shown in FIG. 3A, a diversity controller 26 is provided for the radio transceiver unit 25. The feed lines 23 from the two antennas 20 are connected to the diversity controller 26 to select the antenna 20 having better reception. An amplifier 27 is connected to the diversity controller 26 to amplify signals from the antenna 20 selected by the diversity controller 26. The amplified signals are transferred to a signal processing unit 28. The signal processing unit 28 converts radio signals transmitted and received by the antenna 20 into digital signals and executes a process to communicate with the control circuit of the computer terminal.

The ground line 24 is connected to a ground (first ground) 29 made of conductive material, for example, metal and provided in the radio transceiver unit 25.

It should be appreciated that the radio transceiver unit 25 may be built into the computer terminal by default or may be configured as a card-type unit, e.g., PCMCIA, to be removably inserted into the computer terminal.

Figure 9:
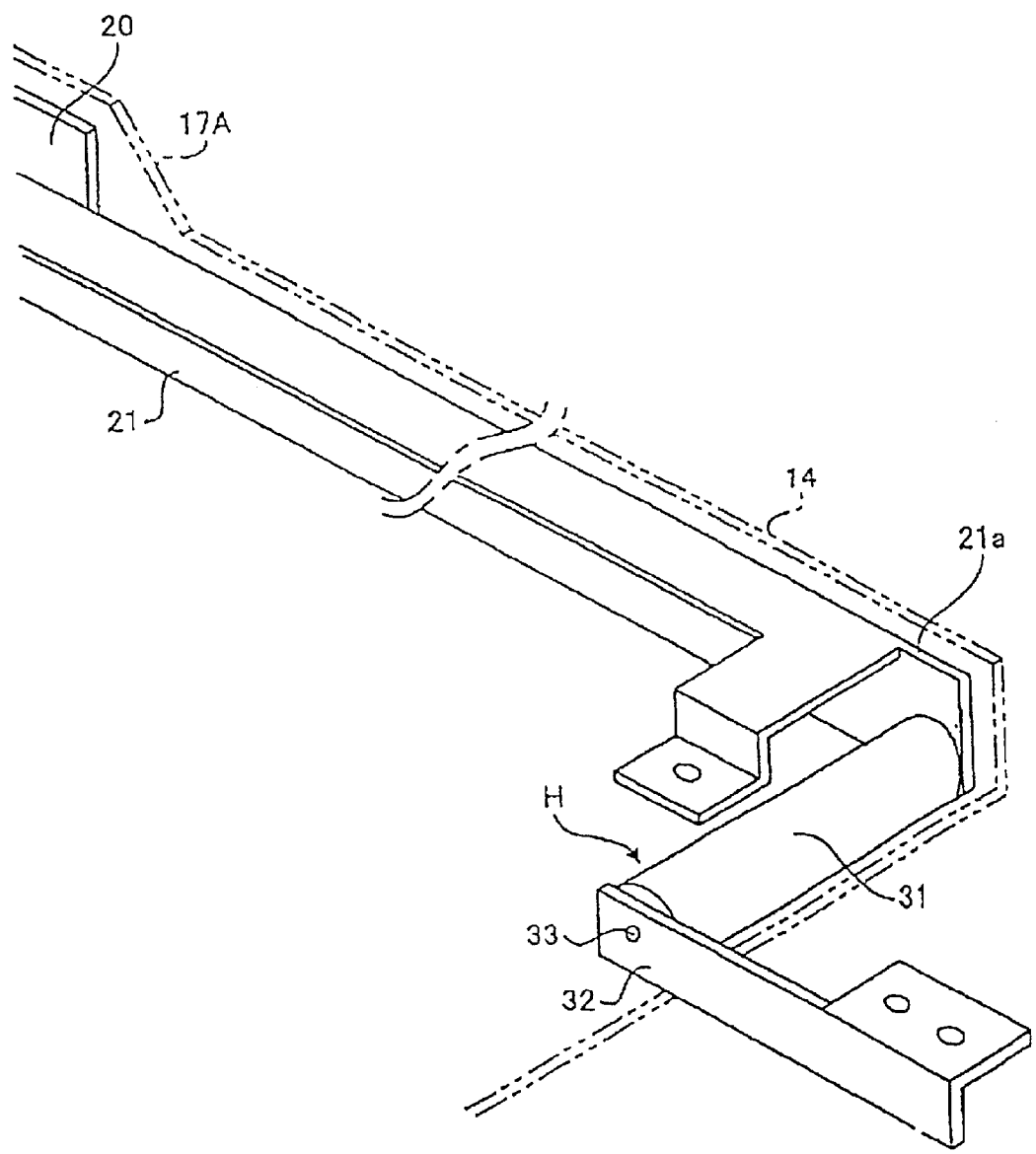
FIG. 9 is a perspective view for showing a connection between a stay provided with an antenna and a display panel housing according to an embodiment of the present invention.

As shown in FIG. 9, the base end 21a of the stay 21 on which the antenna 20 is installed is connected to a hinge unit H which connects the display panel housing 14 and the base housing 12. Specifically, to configure the hinge unit H, the stay 21 is provided on one end of a sleeve 31 formed integrally with the display panel housing 14 and a hinge stay 32 to be fastened to the base housing 12 is provided on the other end of the sleeve 31. Then, the stay 21 and the hinge stay 32 are connected to the sleeve 31 in close contact with the end surface thereof by using a shaft 33 and a nut (not shown) both of which are made of conductive material such as metal. This can allow the stay 21 to have a configuration that the base end 21a is electrically connected with the display panel housing 14 through the sleeve 31.

It should be appreciated that due to the above-mentioned configuration, the antenna 20 comprised of a plate type slot antenna can be located within a plane orthogonal to the display surface 13v of the display panel 13 and between the outer side face 13s of the display panel 13 and the surrounding wall 16 of the display panel housing 14. This can minimize the distance between the display panel 13 and the display panel housing 14. As a result, the computer terminal housing including the antenna 20 may not be any larger than the computer terminal housing alone, while still securing a maximum size of the display panel 13.

It should be also appreciated that in this configuration, the radiator portion 20a of the antenna 20 is projecting from the frame 13A of the display panel 13 and the stay 21 which are made of conductive material, by a length more than the predetermined dimension S and also projecting from the cut-out 17a formed in the display panel housing 14 which is also made of conductive material. This can allow the radiator portion 20a to be separated from the portions made of conductive material by a distance needed to secure the receiving performance as a slot antenna and thus, the receiving performance can be kept good. Since the antenna 20 is implemented with a slot antenna, the distance between the radiator portion 20a and the conductive material can be smaller than the case of sleeve dipole antenna which is typically used. Moreover, the configured antenna 20 is contained in the stiffening ribs 17A and 17C to prevent deformation in the display panel housing 14 and this may eliminate the need for additional projections or the like.

In addition, the ground portion 20b of the antenna 20 is connected not only to the ground 29 provided for the radio transceiver unit 25 through the ground line 24 but also to the portion of the hinge unit H that is made of conductive material, that is, the display panel housing 14 through the stay 21. This configuration can allow the antenna 20 to comprise the ground 29 of the radio transceiver unit 25 as a first ground and the display panel housing 14 made of conductive material as a second ground. Also, the ground portion 20b of the antenna 20 is in electrically connected with the frame 13A of the display panel 13 through the stay 21 and thus, the frame 13A can serve as a ground. Therefore, a maximum ground capacity can be secured to improve the receiving performance of the antenna 20 even if the display panel housing 14 is made of conductive material (CFRP).

The antenna 20 is built in the stiffening ribs 17A and 17C and the stiffening ribs 17A and 17C will be located on the top of the computer terminal in use when the base housing 12 is placed on the desk and the display panel housing 14 is opened to be in an upright position so that the display 13 faces the user. Namely, the antenna 20 can be located on the top of the computer terminal, thus the reception may be improved as compared with the case of the antenna being located in lower positions.

It should be appreciated that a slot antenna is used as the antenna 20 according to this embodiment but an inverted-F type antenna may be used. FIG. 7B shows the configuration that an inverted-F type antenna is used as an antenna 20'. FIG. 7B differs from FIG. 7A only in that the antenna 20' of inverted-F type is installed in place of the antenna 20 and other components which are common to both drawings are designated with the same reference numerals but they are not further described here.

FIG. 10 shows the general configuration of a slot antenna according to the present invention. The component 91 represents the ground plane provide by the laptop display frame, some metal support structure or the RF shielding foil on the back of the display. Components 102, 103, and 104 can be made from a single thin wire, stamped from a metal sheet, or built into the metal support frame of the display. The component 105 can be the inner conductor of the coaxial cable 106. The outside metal shield 107 of the coaxial cable 106 is connected to the ground plane 101.

FIG. 11 shows the general configuration of the inverted-F antenna implemented in this invention. Components 108 and 109 are either made from a single thin wire or stamped from a metal sheet.

FIGS. 12 and 13 show possible antenna components for slot and inverted-F antennas, respectively.

While the slot antenna needs a half-wave length which is half the wavelength of radio signals to be transmitted and received, the inverted-F type antenna may have a radiator portion 20a' of quarter-wave length and thus, stiffening ribs 17A' and 17C' and a cut-out 17a' in the configuration that the antenna 20' is implemented with such an inverted-F type antenna may be half in length as compared with the configuration as shown in FIG. 7A.

Figure 15:
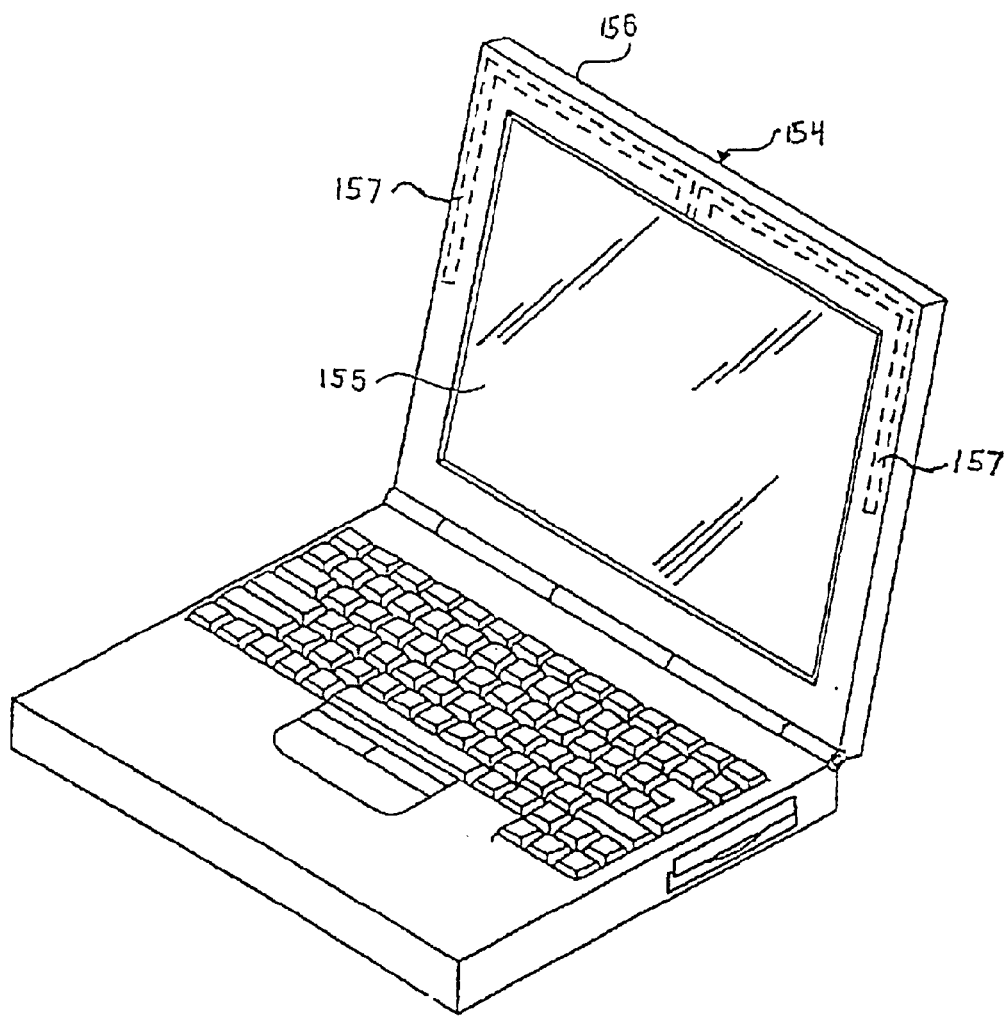
FIG. 15 (prior art) is a perspective view for showing another computer terminal provided with a prior antenna.

The antenna 20' of inverted-F type may be shorter than a comparable slot antenna. The slot antenna generally has a higher receiving performance than the inverted-F type antenna. Table. 1 shows a comparison made among the computer terminal having the antenna 20 of slot antenna (see FIG. 7A) and the computer terminal having the antenna 20' of inverted-F type antenna (see FIG. 7B) and a computer terminal having a sleeve dipole antenna 7 according to the prior art (see FIG. 15). The antenna 20 is denoted as "Slot", the antenna 20' is denoted as "Inverted-F", and the antenna 157 is denoted as "Sleeve Dipole". In a notebook type computer terminal 154 shown in FIG. 15, an antenna 157 is built in a housing 156 which includes a display panel 155. It should be appreciated that the antenna 157 is located in the outer portion of the display panel 155 in the housing 156. Still another antenna denoted as "Slot (Bump)" is the case shown in FIG. 16 and described later.

TABLE 1

|  | Sleeve Dipole | Slot | Inverted-F | Slot (Bump) |
| --- | --- | --- | --- | --- |
| Average Gain (dBi) | −4.1 | 0.4 | −2.5 | 0.6 |
| Relative Range | 1 | 1.5 | 1.2 | 1.5 |

In an anechoic chamber, radiation patterns of these antennas were measured by emitting radio signals of 15 dB from a standard gain horn placed at a distance of 1.4 m and rotating a computer terminal on a metal turntable. The average gains and relative gains of the radiation patterns are shown in Table 1. As may be seen from Table 1, the antennas 20 and 20' according to this embodiment can have much higher average gains than the prior art antenna 157.

Figure 17A:
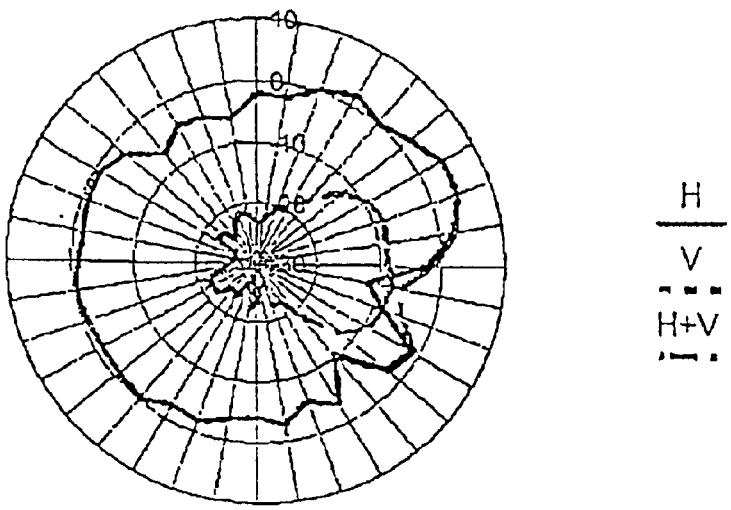
FIGS. 17A to F show radiation patterns from radio radiation tests according to an embodiment of the present invention.
Figure 17B:
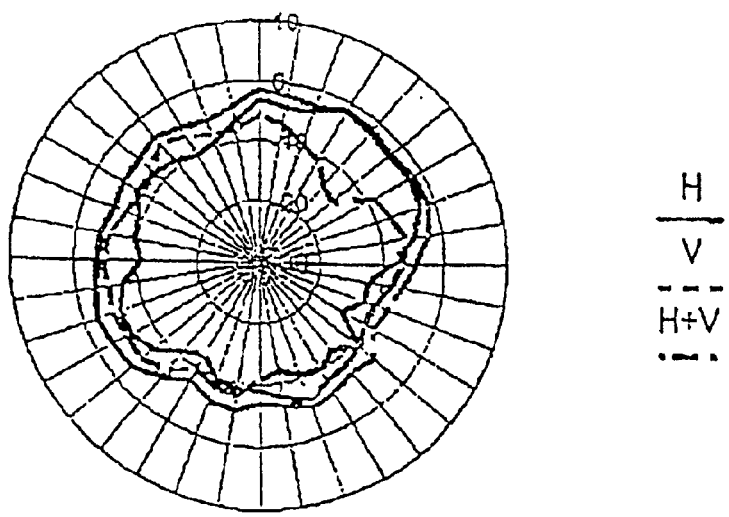
Figure 17C:
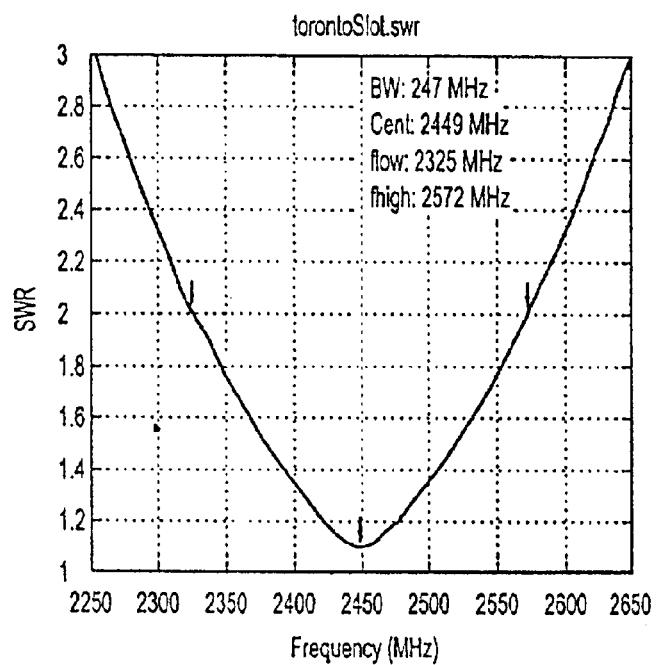

FIGS. 17A and 17B show the radiation patterns of the antenna 20 (FIG. 17A) and the antenna 20' (FIG. 17B) obtained from the measurements. In FIGS. 17A and 17B, the reference character "H" denotes a radiation pattern when a horizontally polarized radio is emitted, "V" denotes a radiation pattern when a vertically polarized radio is emitted, and "H+V" denotes a radiation pattern when both a horizontally polarized radio and a vertically polarized radio are emitted. Values shown in the figures together with the radiation patterns are gain values of the antennas 20 and 20'.

Figure 17D:
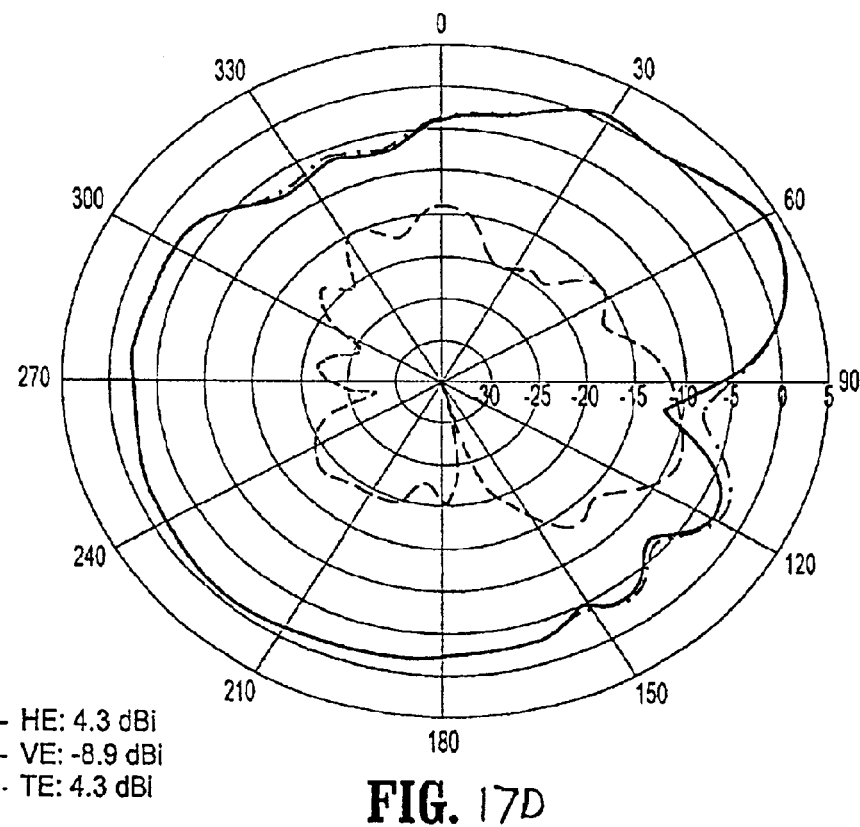
Figure 17E:
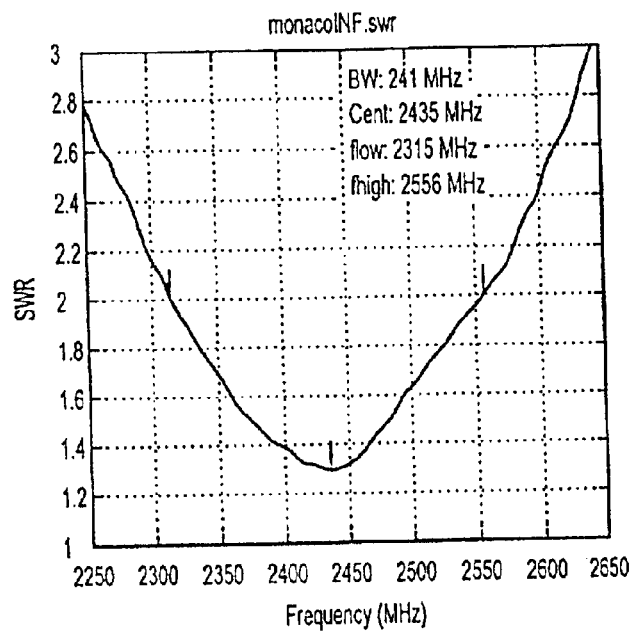
Figure 17F:
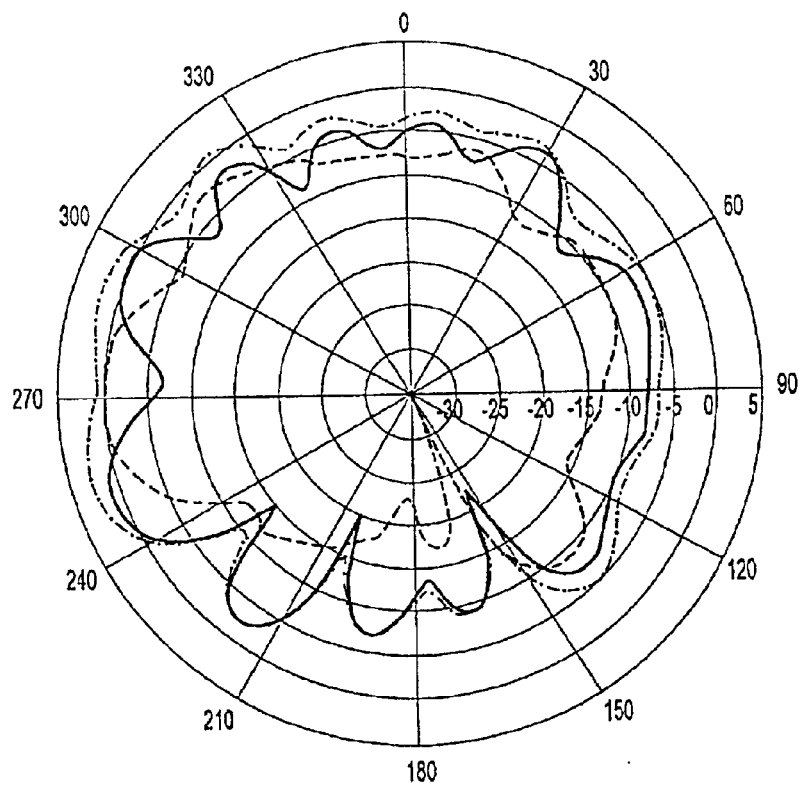

Referring to FIGS. 3B, 3C, 3E, and 3F, FIGS. 17C and 17E show the measured SWR for slot and inverted-F antennas, respectively. The SWR is preferably wide enough for about 2.4 GHz bandwidth. FIGS. 17D and 17F show a horizontal plane radiation patterns for individual slot and inverted-F antennas respectively. FIGS. 17C through 17F represent actual antenna performance measured using an IBM ThinkPad®. In the radiation patterns, HE, VE, and TE refer to the horizontal, vertical and total electrical fields respectively.

Next, a second embodiment wherein the housing of a computer terminal is made of non-conductive material will be described below. It should be appreciated that since the first embodiment described above differs from the second embodiment described below only in housing material and ground structure of the antenna 20 (or 20'), such differences are mainly described below and common components are designated with the same reference numerals but they are not further described here.

The computer terminal shown in FIG. 3A comprises a base housing (second housing) 40 with a keyboard 11 and a display panel housing (housing, first housing) 41 with a display panel 13 and an antenna 20 built in on each side thereof and the base housing 40 and the display panel housing 41 are rotatably connected to each other through a hinge unit H. It should be appreciated that the base housing 40 and the display panel housing 41 are made of non-conductive material such as, for example, acrylonitrile-butadiene-styrene (ABS) resin.

Figure 18:
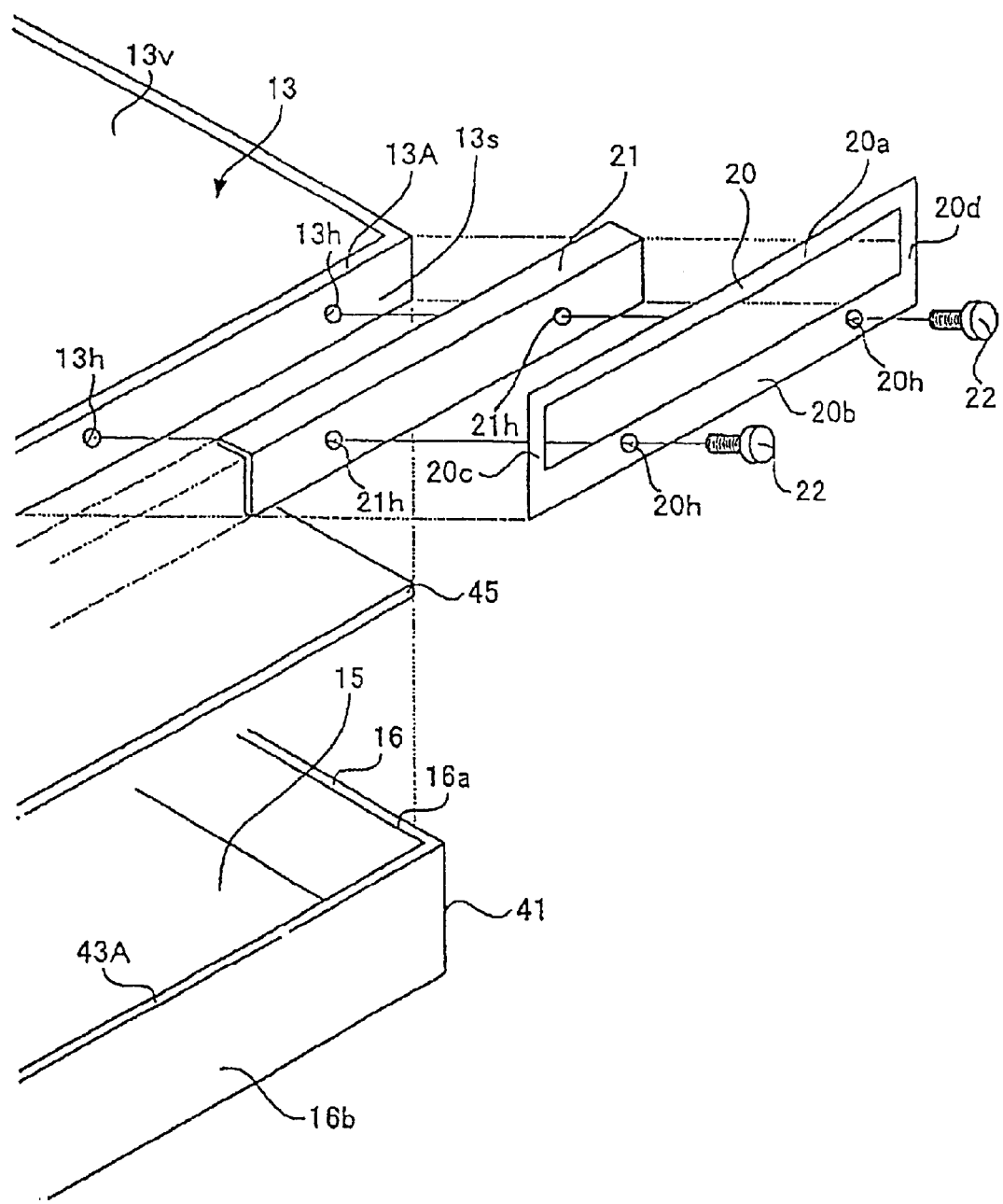
FIG. 18 is a perspective view for showing a portion of stiffening ribs provided with an antenna according to an embodiment of the present invention.

As shown in FIG. 18, the display panel housing 41 has a bottom surface 15 and a surrounding wall 16 rising up from the outer portion thereof.

In addition, as shown in FIG. 3A, the surrounding wall 16 is formed to have stiffening ribs 43A, 43B, and 43C in an area including an edge 16a on the opposite side of the base housing 40 and part of other edges 16b and 16c adjacent to the edge 16a to avoid deformation in the display housing 41. It should be appreciated that the stiffening ribs 43A and 43C on both sides of the display panel 13 have no cut-put 17a (see FIG. 5) like the stiffening ribs 17A and 17C in the first embodiment described above, since the display panel housing 41 is made of non-conductive material.

An antenna 20 is built in the stiffening ribs 43A and 43C on both sides of the display panel 13. This antenna 20 is fastened to a stay 21 and a frame 13A of the display panel 13 by using mounting screws 22 made of conductive metal material and thus, the antenna 20 intervenes between the outer side face 13s of the display panel 13 and the edge 16b of the surrounding wall 16.

In this way, a ground portion 20b of the antenna 20 is electrically connected to the frame 13A of the display panel 13 through the stay 21.

On the back surface of the display panel 13, a ground plate (second ground) 45 made of, for example, aluminous metal is provided and the stay 21 is electrically connected to the ground plate 45. The ground portion 20b of the antenna 20 is connected to the ground plate 45 through the stay 21.

As shown in FIGS. 19 and 20(a), a radiator portion 20a of the antenna 20 is projecting from the frame 13A of the display panel 13 and the stay 21 by a length more than a predetermined dimension S in the direction orthogonal to a display surface 13v of the display panel 13.

As shown in FIG. 19(a), one end of an feed line 23 is joined to the antenna 20 through some joint means such as soldering at a predetermined location which is to be a feeding point for the radiator portion 20a. A ground line 24 is joined to the ground portion 20b at a predetermined location through some joint means such as soldering.

As shown in FIG. 8, feed line 23 is connected to an amplifier 27 through a diversity controller 26 of a radio transceiver unit 25. The ground line 24 is also connected to a ground 29 provided in the radio transceiver unit 25.

Also in the computer terminal having the display panel housing 41 of non-conductive material as described above, the antenna 20 of plate type slot antenna is configured to be located in a space between the display panel 13 and the surrounding wall 16 of the display panel housing 41. This configuration can minimize the distance between the display panel 13 and the display panel housing 41. As a result, the computer terminal housing can be prevented from upsizing, while securing a maximum size of the display panel 13.

It should be also appreciated that in this configuration, the radiator portion 20a of the antenna 20 is projecting from the frame 13A of the display panel 13 and the stay 21, which are made of conductive material, by a length more than the predetermined dimension S. This can allow the radiator portion 20a to be separated from the portions of made of conductive material by a distance necessary to secure the receiving performance as a slot antenna and thus, the receiving performance can be kept good.

In addition, the ground portion 20b of the antenna 20 is connected to the ground 29 of the radio transceiver unit 25 through the ground line 24 and to the ground plate 45 of the display panel 13 through the stay 21. This configuration can allow the antenna 20 to comprise the ground 29 of the radio transceiver unit 25 as a first ground and the ground plate 45 of the display panel 13 as a second ground and thus, a maximum ground capacity can be secured. This can also improve the receiving performance of the antenna 20.

In the second embodiment, as with in the first embodiment described above, the antenna 20' of inverted-F type can be adopted in place of the antenna 20 as shown in FIG. 19(b). This may reduce the length of the stiffening ribs 43A' and 43C' to approximately half those shown in FIG. 19(a).

In the first and second embodiments, the antennas 20 and 20' may be located in any place, for example, on the upper portion of the display panel 20, instead of being located on both sides of the display panel 20. In addition, the number of antennas 20 or 20' is not limited to two and a single antenna may be used. Of course, the diversity controller 26 may be omitted in such an alternative configuration.

Figure 16:
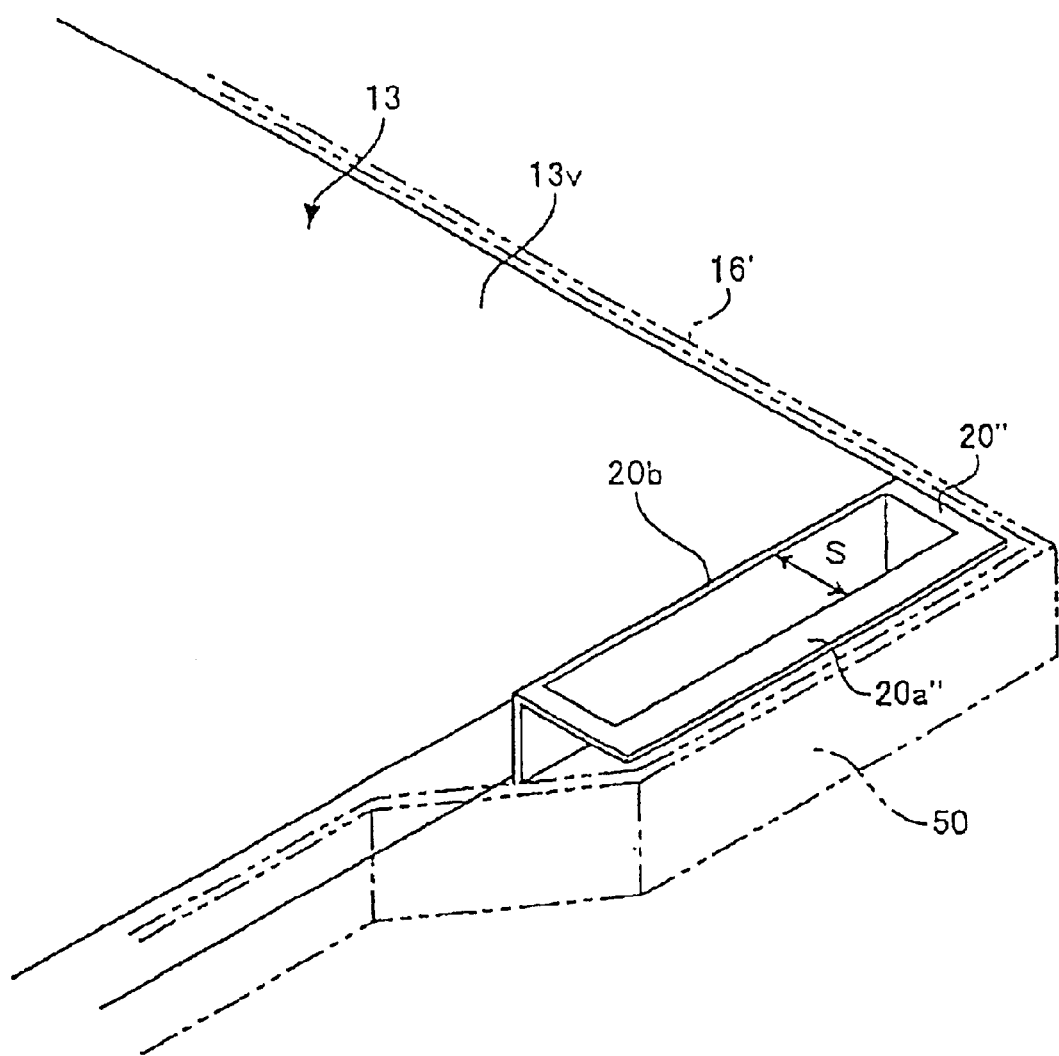
FIG. 16 is a perspective view for showing still another antenna according to an embodiment of the present invention.

It should be appreciated that in these embodiments, the radiator portion 20a or 20a' of the antenna 20 or 20' is provided at a distance in the direction orthogonal to the display surface 13v of the display panel 13 but instead, it may be provided at a distance in the direction parallel to the display surface 13v of the display panel 13. FIG. 16 shows an example of the alternative configuration wherein a radiator portion 20a" of an antenna 20" is provided at a distance more than a predetermined dimension S from the portion made of conductive material such as the frame 13A in the direction parallel to the display surface 13v of the display panel 13. For this purpose, the surrounding wall 16' of the display panel housing 14 must have a bulging 50 which bulges toward outside. It should be appreciated that the shape of the antenna 20" and other components except the bulging 50 are similar to those in the above-mentioned embodiments and they are not further described here.

It should be further appreciated that an inverted-F type antenna may be adopted instead of the antenna 20" as shown in FIG. 16 and in this configuration, the radiator portion of the inverted-F type antenna may be located in a plane approximately parallel to the display surface 13v of the display panel 13 and at a distance more than a predetermined dimension S from the portion made of conductive material such as the frame 13A.

Figure 20:
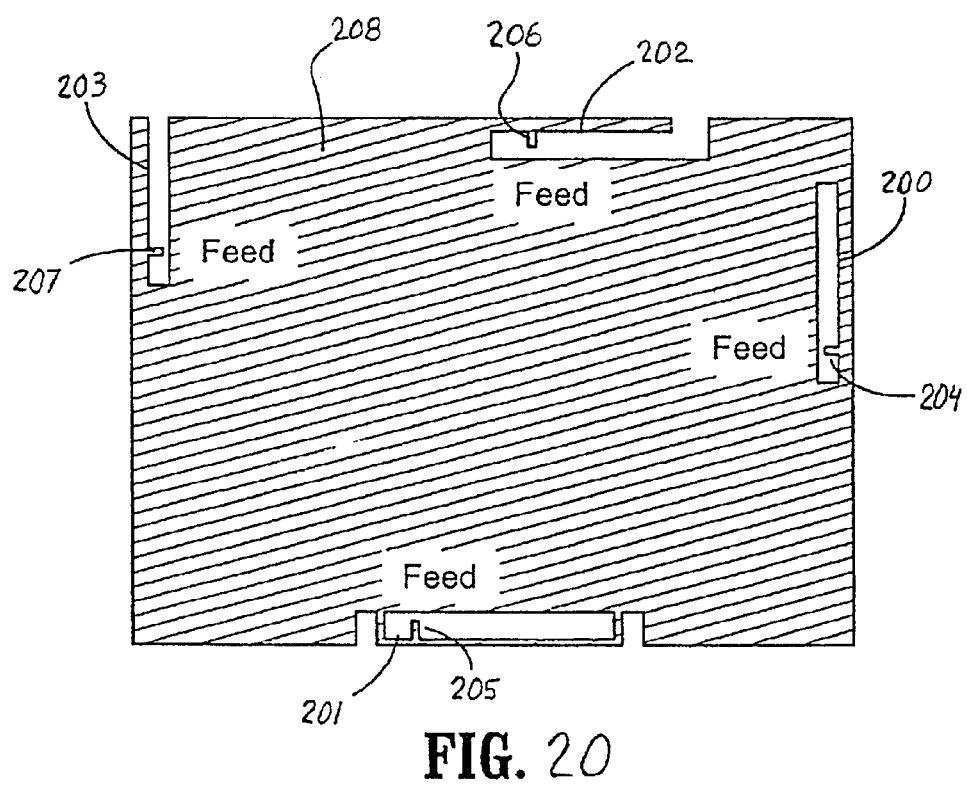
FIG. 20 illustrates various configurations for inverted-F and slot antennas built on an RF shielding foil according to an embodiment of the present invention.

FIG. 20 shows preferred slot 200, 201 and inverted-F 202, 203 antennas formed in the RF shielding foil 208 on the back of the display. To ensure good efficiency for the antennas built into the RF shielding foil 208 have, the foil material should have good conductivity, for example, aluminum, copper, brass, or gold. In an alternative embodiment of the present invention, either type of antennas has a feed portion 204–207 which is preferably connected to the conductive portion of the coaxial cable 105 (shown in FIGS. 10 and 11). In yet another embodiment, the ground is connected to the antenna opposite the feed line.

It should be further appreciated that the first and second embodiments comprise the antenna 20 of slot antenna or the antenna 20' of inverted-F type but both types of antennas may be used in combination if a plurality of antennas are provided. Alternatively, other types of antennas may be implemented, such as an antenna formed in the RF shielding foil on the back of the display panel, while securing a maximum size of the display panel 13 with good receiving sensitivity.

In addition, the notebook type computer terminal is used for the above-mentioned embodiments but the present invention is not limited to these embodiments and any form of computer terminal may be used if it comprises the antennas 20, 20', and 20" for data transmission/reception and the display panel 13 and alternatively, a similar configuration to those described above may be applicable to a desktop PC, a personal data assistant, or a game terminal with a liquid display panel. Alternatively, a similar configuration to those described above may be also applicable to a display device which comprises the antennas 20, 20', and 20" and the display panel 13. Particularly, for the latter case, data transmitted and received by the antennas 20, 20', and 20" is not necessarily displayed on the display panel 13 and may be used by other devices connected to the display device.

Furthermore, it should be appreciated that selection among the configurations described for the above-mentioned embodiments can be made or various changes and modifications can be made to them without departing the spirit and scope of the present invention.

As described above, according to the present invention, antennas can be provided in a computer terminal without needing a larger housing nor smaller display panel having good reception even when the housing is made of conductive material.

Having described preferred embodiments of an integrated antenna for laptop applications, it is noted that modifications and variations can be made by persons skilled in the art in light of the above teachings. It is therefore to be understood that changes may be made in the particular embodiments of the invention disclosed which are within the scope and spirit of the invention as defined by the appended claims.

What is claimed is:

1. A display device, comprising:
    a display panel having a display surface for images and an outer side face adjacent to said display surface;
    a housing containing said display panel and having an inner surface opposed to said outer side face of said display panel;
    an antenna located between said outer side face of said display panel and said inner surface of said housing;
    wherein said antenna includes a radiator portion provided at a predetermined distance from a conductive material portion of said display panel and/or said housing and a ground portion connected to said portions made of conductive material;
    a rib formed on the outer portion of said housing so that it projects approximate vertically to said display surface of said display panel; and
    a frame filling a space between said housing and said display panel wherein said antenna is sandwiched between said rib and said frame.

2. The display device according to claim 1, wherein said antenna is a plate type slot antenna or an inverted-F type antenna.

3. The display device according to claim 1, wherein said radiator portion of said antenna is located at a predetermined distance from said portions made of conductive material in a direction orthogonal to said display surface of said display panel.

4. The display device according to claim 1, wherein said radiator portion of said antenna is located at a predetermined distance from said portions made of conductive material in a direction parallel to said display surface of said display panel.

5. A computer terminal which is capable of opening and closing, comprising:
    a first housing with a built-in display panel; and
    a second housing rotatably connected to one end of said first housing wherein said first housing has a rib on its outer portion which projects from the side opposed to said second housing wherein said rib contains a plate type antenna which transmits and receives radio signals for communicating data between said computer terminal and outside, wherein said second housing has, at a location corresponding to said rib of said first housing, a recess for receiving said rib when said first housing and said second housing are closed.

6. The computer terminal according to claim 5, wherein said antenna is formed to be located on almost the top of said computer terminal when said first housing is opened to be in an upright position with respect to said second housing.

7. The computer terminal according to claim 5, wherein said antenna has a radiator portion which transmits and receives radio signal, provided at a distance larger than a dimension determined from the wavelength of radio signals to be transmitted and received by said antenna, from portions of said display panel and said first housing that are made of conductive material.

8. The computer terminal according to claim 5, wherein said rib projects perpendicularly from the side of said first housing opposed to said second housing.

9. The computer terminal according to claim 5, wherein said plate type antenna is fixed within said rib.

10. A computer terminal, comprising:
    a display panel having a display surface for images and an outer side face adjacent to said display surface;
    a housing made of conductive material and having an inner surface opposed to said outer side face of said display panel for containing said display panel;
    a control unit controlling said display panel;
    an antenna transmitting radio signals to receive radio signals from outside and transferring signals based on said radio signals between said control unit wherein said antenna is located between said outer side face of said display panel and said inner surface of said housing and is electrically grounded to said housing;
    another housing rotatably connected to said housing; and
    a hinge unit made of conductive material and rotatably connecting said housing and said another housing wherein said antenna is grounded to said housing via said binge unit.

11. The computer terminal according to claim 10, wherein one end of a ground line is connected to said antenna and the other end of said ground line is connected to a ground made of conductive material.

12. The computer terminal according to claim 10, wherein said antenna has a radiator portion provided ax a predetermined distance from said housing and the frame of said display panel wherein said housing has a cut-out formed to be at a predetermined distance from said radiator portion and said cut-out has a cover made of non-conductive material to fill said cut-out.

13. The computer terminal according to claim 12, wherein a rib is formed on the outer portion to project toward said display surface of said display panel and said rib is provided with said cut-out and said cover.

* * * * *